US011480614B2

(12) United States Patent
Bhunia et al.

(10) Patent No.: US 11,480,614 B2
(45) Date of Patent: Oct. 25, 2022

(54) SIDE-CHANNEL SIGNATURE BASED PCB AUTHENTICATION USING JTAG ARCHITECTURE AND A CHALLENGE-RESPONSE MECHANISM

(71) Applicant: University of Florida Research Foundation, Inc., Gainesville, FL (US)

(72) Inventors: Swarup Bhunia, Gainesville, FL (US); Shubhra Deb Paul, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/097,446

(22) Filed: Nov. 13, 2020

(65) Prior Publication Data

US 2021/0148977 A1    May 20, 2021

Related U.S. Application Data

(60) Provisional application No. 62/935,440, filed on Nov. 14, 2019.

(51) Int. Cl.
| | |
|---|---|
| *G01R 31/3185* | (2006.01) |
| *G01R 31/317* | (2006.01) |
| *G01R 31/302* | (2006.01) |
| *G01R 31/3181* | (2006.01) |
| *G01R 31/3183* | (2006.01) |
| *G06F 21/70* | (2013.01) |

(Continued)

(52) U.S. Cl.
CPC . *G01R 31/318566* (2013.01); *G01R 31/3025* (2013.01); *G01R 31/31703* (2013.01); *G01R 31/31717* (2013.01); *G01R 31/31813* (2013.01); *G01R 31/318328* (2013.01); *G01R 31/318533* (2013.01); *G01R 31/318588* (2013.01); *G06F 21/70* (2013.01); *G06F 21/73* (2013.01); *G09C 1/00* (2013.01); *H04L 9/3278* (2013.01)

(58) Field of Classification Search
CPC ........ G01R 31/318566; G01R 31/3025; G01R 31/31703; G01R 31/31717; G01R 31/31813; G01R 31/318328; G01R 31/318533; G01R 31/318588; G09C 1/00; H04L 9/3278; G06F 21/70; G06F 21/73
See application file for complete search history.

(56) References Cited

U.S. PATENT DOCUMENTS

| | | | |
|---|---|---|---|
| 9,584,329 B1 * | 2/2017 | Trimberger | ........... H04L 9/3278 |
| 2014/0108786 A1 * | 4/2014 | Kreft | ................... G06F 21/335 |
| | | | 713/194 |

(Continued)

OTHER PUBLICATIONS

Gassend, B., Clarke, D., Van Dijk, M., & Devadas, S. (Mar. 2003). Delay-based circuit authentication and applications. In Proceedings of the 2003 ACM symposium on Applied computing (pp. 294-301). (Year: 2003).*

*Primary Examiner* — Cynthia Britt
(74) *Attorney, Agent, or Firm* — Thomas | Horstemeyer, LLP

(57) ABSTRACT

The present disclosure describes exemplary methods and systems that are applicable for hardware authentication, counterfeit detection, and in-field tamper detection in both printed circuit board and/or integrated circuit levels by utilizing random variations in boundary-scan path delay and/or current in the industry-standard JTAG-based design-for-test structure to generate unique device identifiers.

19 Claims, 21 Drawing Sheets

(51) Int. Cl.
    *G06F 21/73*     (2013.01)
    *H04L 9/32*     (2006.01)
    *G09C 1/00*     (2006.01)

(56) References Cited

U.S. PATENT DOCUMENTS

2016/0047855 A1* 2/2016 Bhunia .............. G01R 31/2801
    324/763.01
2018/0060560 A1* 3/2018 Waltermann .......... H04L 9/3226
2018/0205731 A1* 7/2018 Mikolasch ............ H04M 3/305
2019/0311108 A1* 10/2019 Achkir .................... G06F 21/57

* cited by examiner

SIDE-CHANNEL SIGNATURE BASED PCB AUTHENTICATION USING JTAG ARCHITECTURE AND A CHALLENGE-RESPONSE MECHANISM

CROSS-REFERENCE TO RELATED APPLICATION

This application claims priority to U.S. provisional application entitled, "Side-Channel Signature Based PCB Authentication Using JTAG Architecture and a Challenge-Response Mechanism," having Ser. No. 62/935,440, filed Nov. 14, 2019, which is entirely incorporated herein by reference.

BACKGROUND

Counterfeiting and in-field tampering of printed circuit boards (PCBs) have become a significant security concern in the semiconductor industry as a result of increasing complexity in the supply chain. These counterfeit components may result in performance degradation, profit reduction, reputation risk, etc.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
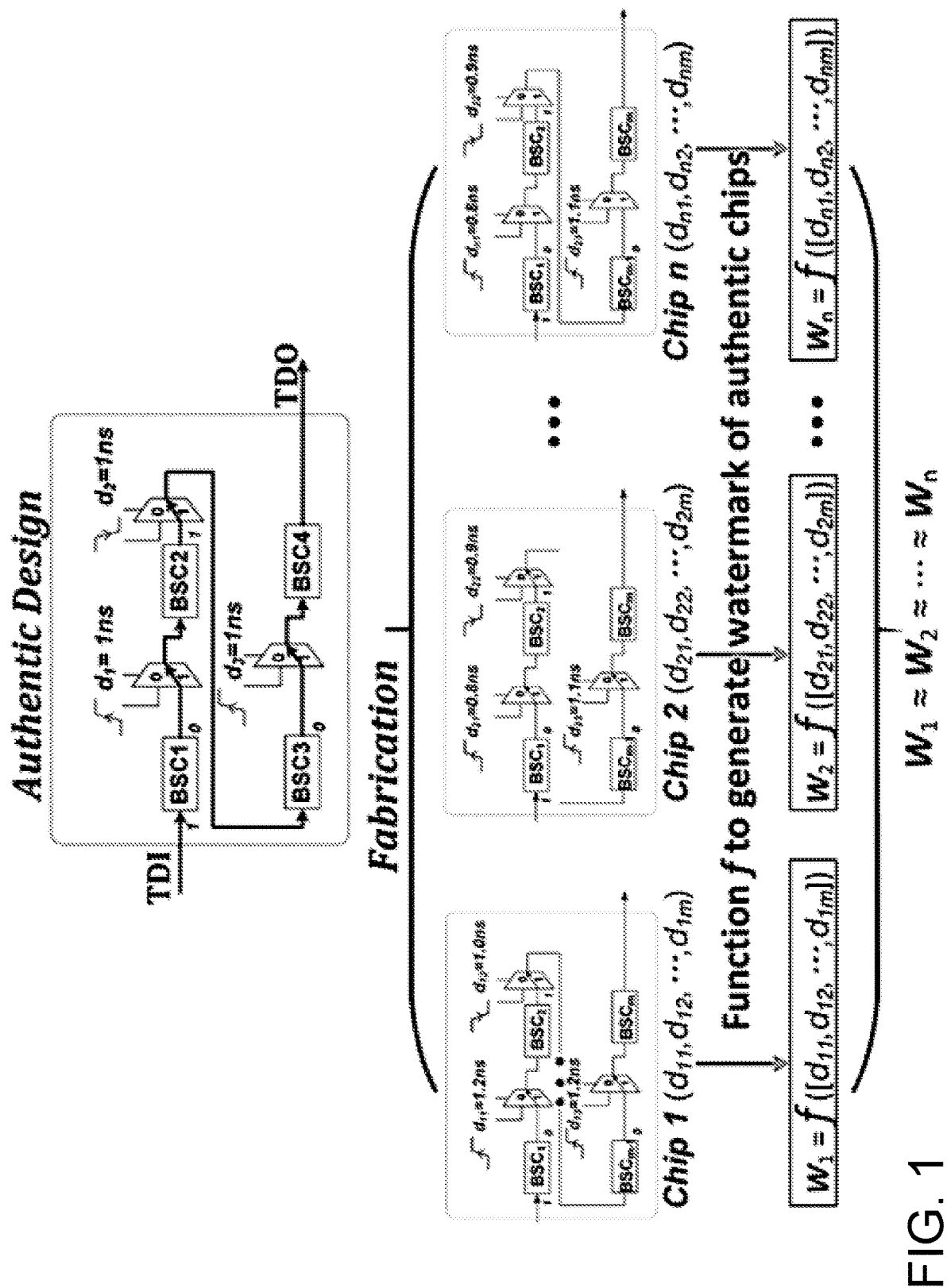
FIG. 1 illustrates delay variations within a boundary scan chain due to manufacturing process variations in accordance with the present disclosure.

The present disclosure introduces novel ideas to combat the hardware counterfeiting, cloning, and tampering attacks. These ideas are developed by incorporating the boundary scan architecture (BSA) present in modern integrated circuits (ICs) and printed circuit boards (PCBs). The existing BSA structure is accessed and controlled by using the industry standard, JTAG (Joint Test Action Group), which allows for performing runtime authentication and to achieve fine-grain control over each component present in a PCB. The present disclosure develops challenge-response based PUF (Physical Unclonable Function) structures, which exploit side-channel parameters (delay, transient current, etc.) to generate high-quality board-specific digital signatures. Using such methods, it is possible to authenticate individual chips present on the PCB. A key advantage of an exemplary method is that the generated signatures demonstrate high uniqueness, robustness, and randomness features. Additionally, exemplary PUF structures are very lightweight, which means that the implementation requires modest hardware overhead.

Accordingly, the present disclosure describes exemplary methods, systems, and protocols that are applicable for hardware authentication and counterfeit detection in both PCB and IC levels by utilizing random variations in boundary-scan path delay and/or current in the industry-standard JTAG-based design-for-test (DFT) structure. Such systems and methods are effective on the following attack scenarios.

In an attack based on direct cloning of the whole PCB, an opportunistic counterfeiter collects a sample PCB, traces the layout through reverse-engineering, and hence replicates the whole design. Here, the side-channel parameters (e.g., delay, current, etc.) of the PCB changes, which can be effortlessly detected by an exemplary method of the present disclosure. Another scenario is where PCBs are collected up by ghost shift workers in a manufacturing facility and soldered with counterfeit or substandard chips and components. In this case, the JTAG architecture becomes useful again because it allows for accessing the connected ICs and authenticate them individually using an exemplary method of the present disclosure. Physical in-field tampering is another aspect that is covered by the present disclosure as well, where the adversary tries to connect or disconnect elements to or from the PCB to gain malicious control over it. Such kind of activities alters the usual fingerprint of the PCB. The JTAG chain allows for capturing the current state device when it is operational and it can detect the change occurred due to this attack using an exemplary method of the present disclosure. Systems and methods of the present disclosure can be used to address in-field tampering, supply chain tampering, repair authentication, and counterfeiting.

For example, in-field tampering detection is an important feature of the present disclosure. Some of the creative ways in-field tampering modifications are done include rerouting the layout paths, adding or subtracting circuit elements, snooping into available ports or pins, etc. Previously, PCB tampering has been performed on gaming consoles by incapacitating the digital rights management (DRM) policy. In this process of physical modifications, the hacker can bypass the actual authentication process, which allows him/her to play pirated and unauthentic versions of the games. Modchips are some of the popular devices that are used to perform this kind of tampering. ModChips usually contain a microcontroller, FPGA, or complex programmable logic device (CPLD) for attacking the host system and are soldered into the host system & used to attack critical traces on a PCB. Such tampering attacks alter the overall PCB-level signatures. However, exemplary systems and methods of the present disclosure can successfully detect these types of tampering attacks.

Supply chain tampering is another kind of altering possible in the supply chain of a PCB. In this scenario, both the design house and the manufacturer are considered as trusted parties. However, the tampering could take place in the supply chain by an untrusted party. Adding an unwanted component changes the PCB-level fingerprint, and exemplary systems and methods can also identify this kind of attack.

One more use case is the authentication of components during the repair stages. Authentication happens after a product (such as a network router, etc.) is used for a certain period of time and they are sent back to the service centers for repair. The repairer may ultimately find that one or more components present in the board are not from the OEM (Original Equipment Manufacturer). Such a situation can easily be tackled by exemplary systems and methods as they not only work at the manufacturing stage but also at the repair stage.

Additionally, counterfeit detection is another important feature of the present disclosure. Accordingly, exemplary systems and methods can perform authentication in both chip and PCB-level with high confidence, which can be utilized for detecting counterfeit components.

In the discussion that follows, the present disclosure presents an approach to creating an intrinsic device identifier, which captures the state of the device that can effectively reflect any physical tampering during the deployment period. In various embodiments of the present disclosure, the delay and/or intrinsic current variations in the boundary scan architecture (BSA) are translated into a digital fingerprint in the form of a set of challenge-response pairs (CRPs), in which BSA is an extensive design-for-test (DFT) structure for testing interconnects on PCBs, and it is inherent in most ICs. The present disclosure uses the JTAG (Joint Test Action Group), the IEEE 1149.1 protocol, to create unique signatures that can be used to perform runtime authentication of both ICs and PCBs. Accordingly, tamper detection is possible using the existing JTAG chain in PCB.

The present disclosure also presents a novel IC authentication and key generation method utilizing a current-based PUF. Being the first of its kind, such an exemplary method is based on the dynamic current variations during temporal switching activity for a specific design such as shift registers loaded into an FPGA (floating point gate array). In one embodiment, a 16-bit linear feedback shift register (LFSR) is mapped into an FPGA, and the total supply current is measured externally for different input seed values. During experimental testing, 100 different seeds were applied as challenges to the LFSR, the output responses were recorded as current, and hence, a signature-generating algorithm was applied to transform the analog current values into a 1200 bit long IC-specific digital signature. Further, the foregoing approach was applied to 20 different ICs and corresponding challenge-response pairs (CRPs) were generated. The implemented design is noted to have modest hardware overhead, and the size of the LFSR design can be easily manipulated (e.g., 64, 256, 1024 bits, etc.) for performance optimization.

In the discussion that follows, various embodiments are presented that modify a typical voltage regulator (VR) by including a current sensor inside the VR. An exemplary embodiment of the redesigned VR module includes a JTAG control unit, an analog to digital converter (ADC), and a wireless communication module using Bluetooth/Wi-Fi. Accordingly, the modified VR enables the unification of the whole authentication process inside a single chip and enables remote authentication.

In recent times, a few articles have been published regarding current-based PUFs at the chip-level. A majority of these solutions for electronic hardware are aimed towards mitigation of IC counterfeiting issues, and they are not directly applicable to PCBs. Thus, to the best of our knowledge, none of the existing methods works for authentication and tamper detection at both IC and PCB-level. Table 1 (below) shows an overall comparison between the published literature and an exemplary solution of the present disclosure.

TABLE 1

| Particulars | Existing Literature | Exemplary Solution |
| --- | --- | --- |
| Combined IC and PCB authentication | No | Yes |
| Hardware overhead | High | Low |
| Runtime authentication | No | Yes |
| Hardware tamper detection | No | Yes |
| On-chip current measurement | No | Yes |
| On-chip signature generation | No | Yes |
| Wireless transfer of generated signatures | No | Yes |

As a brief overview, the dynamic current in an electronic circuit is a strong function of switching activities of the circuit. These activities are directly proportional to the load capacitances and statistical nature of the input signal. An input signal which does not change much over time will result in a minute switching activity and the overall dynamic current flow should be very small. On the other hand, a fast-changing input signal will cause a comparatively larger dynamic current.

Sequential circuit elements like flip-flops (FFs) contain cross-coupled CMOS inverter pairs, and due to the nature of their circuit structure, they have the potential to generate a significant amount of switching current. Because of the inevitable intra and inter-die variations during the IC manufacturing process, device parameters such as geometry, the density of doping, the threshold voltage ($V_{th}$), dielectric thickness ($t_{ox}$), etc. fluctuate randomly. As a result, electrical properties like gate capacitances vary within the device and across dies, and following that the amount of current owing through the transistors change. On the other hand, the switching activity triggered by the transition at every rising/falling edge of the clock cycle in an FF determines the individual current flow. Depending on the number of FFs present in the LFSR network and input data (seed value), the amount of current varies correspondingly.

FIG. 1 shows delay variations within a boundary scan chain, such that after fabrication, delay of each BSC path deviates from the nominal delay value due to a manufacturing process variations. As depicted in FIG. 1, four consecutive BSCs in the BSCA are connected by 3 paths. Due to the process variations, authentic PCBs manufactured with the same process technology have a similar delay distribution while counterfeit ones follow another delay distribution. Thus, a PCB manufacturer can first select authentic PCBs and measure corresponding BSC path delays. Customers in the supply chain or end users who want to check the authenticity of PCBs can generate the fingerprint following the same procedure as the manufacturer. In accordance with the present disclosure, using this existing BSA structure alleviates the design overhead associated with alternative anti-counterfeiting approaches. Since random process variations are unique from device to device, this characteristic is utilized in an exemplary current-based PUF in accordance with embodiments of the present disclosure.

Figure 2A:
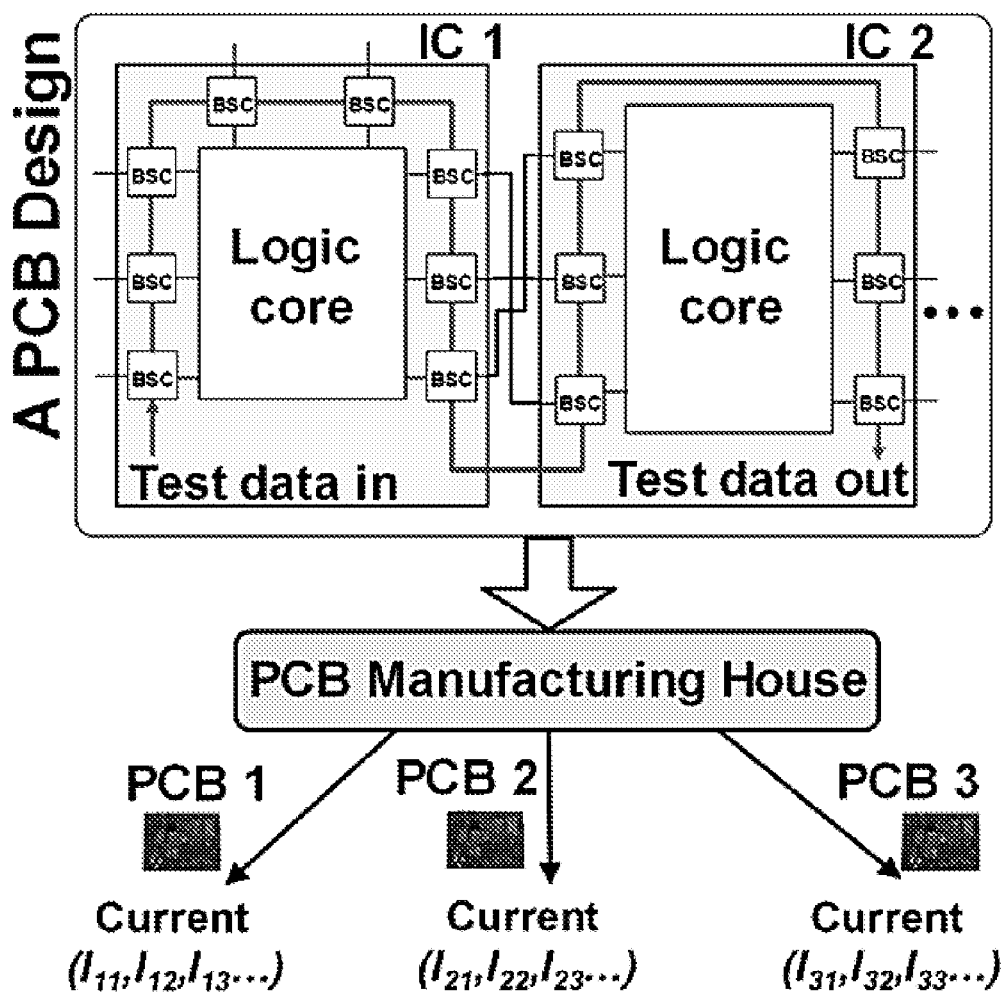
FIG. 2A illustrates the location of a boundary-scan chain (BSC) in different chips in a printed circuit board (PCB) and the interconnection of multiple chips using boundary scan architecture (BSA) inside the PCB in accordance with the present disclosure.

Various embodiments of the present disclosure create a unique signature based on current variations spawned by the shifts in the input test patterns within Boundary Scan Cells (BSCs). FIG. 2A illustrates the location of a boundary scan chain in different chips in a PCB and how multiple chips are interconnected using BSA inside a PCB. From the figure, we can see that test data is inserted in a first IC chip (IC1), after traversing its scan chain, the data enters the scan of a second IC chip (IC2), and then, the test data is outputted. During the data transmission period, the transient current is measured and subsequently used to generate a digital fingerprint, in accordance with embodiments of the present disclosure. Following this procedure, a PCB manufacturing house can fabricate PCBs and generate digital signatures for all of them, which may be used to authenticate the PCBs after deployment.

Figure 2B:
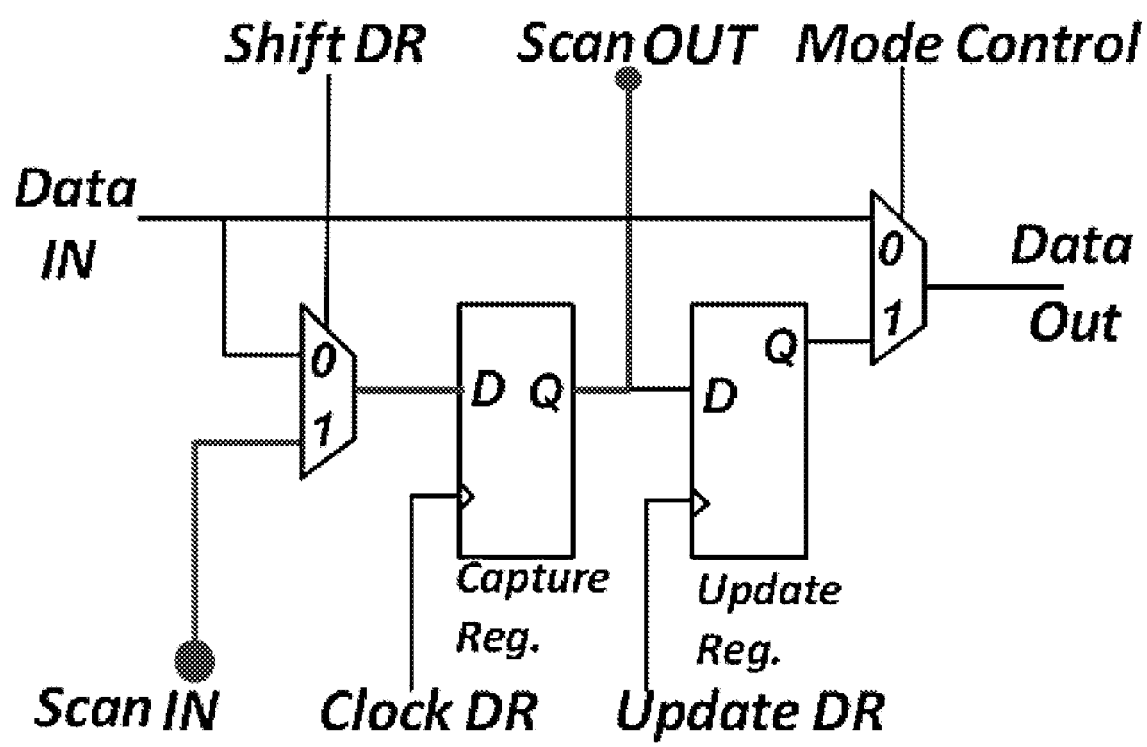
FIG. 2B depicts a structure of the BSC in accordance with the present disclosure.

FIG. 2B shows the structure of a BSC, in which the BSC can shift or capture information from logic cores, input pins, or shift serial input from a JTAG interface. The figure shows that BSCs are connected like a shift register in the boundary scan register. The BSC includes the capture register and update register triggered by 'ClockDR' and 'UpdateDR' from a TAP (Test Access Port) controller. In operation, a test vector can be scanned into each BSC by port 'ScanIN' and shifted out through 'ScanOUT' such that the BSC can force a signal onto a pin and capture data from the pin, adjacent BSC, or core logic. In particular, the capture registers can access logic core or I/O pins via the multiplexer controlled by 'ShiftDR' and the update registers provide the data externally through I/O pins.

Figure 2C:
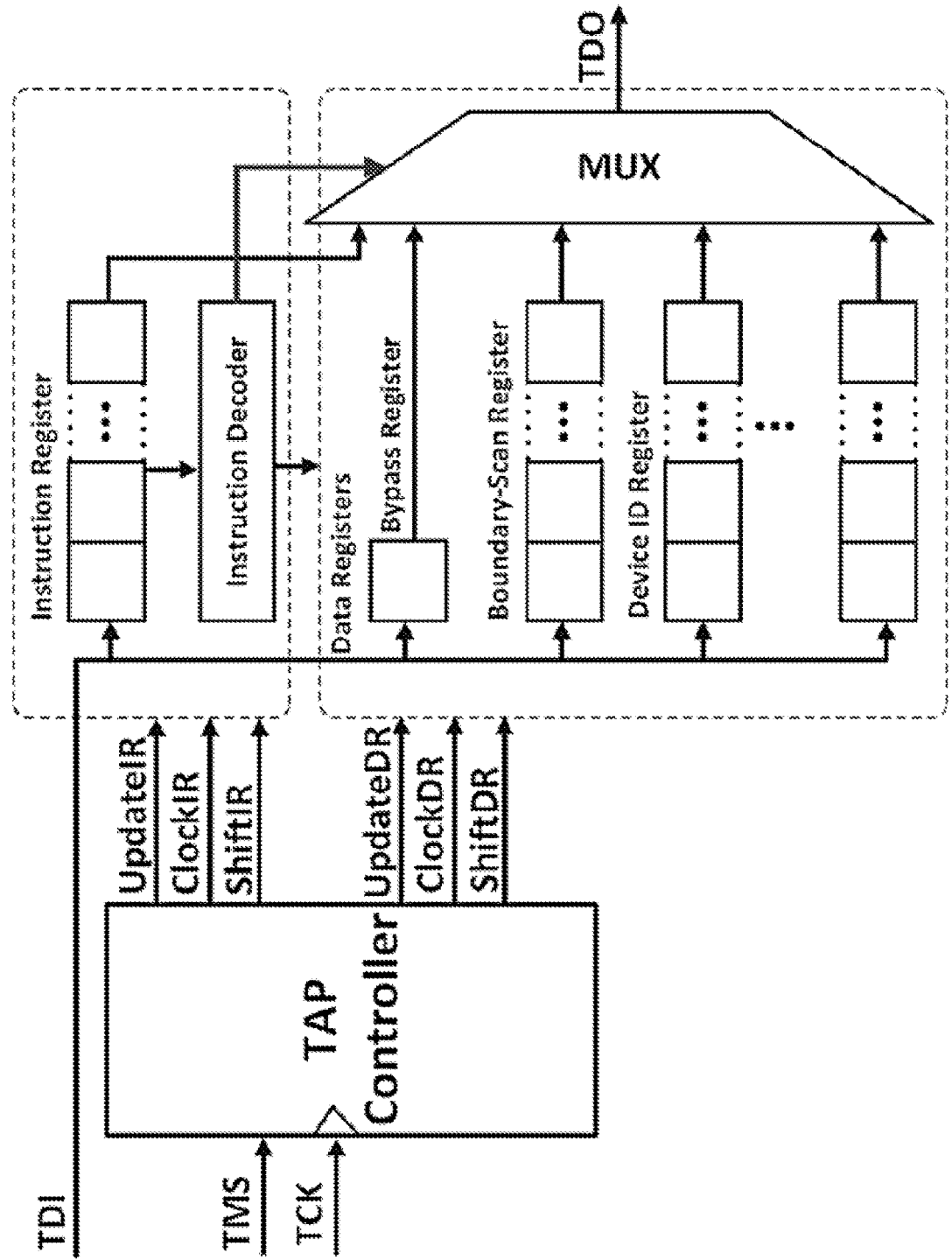
FIG. 2C depicts a functional model of JTAG (Joint Test Action Group) architecture in accordance with the present disclosure.

An example architecture of the JTAG interface is shown in FIG. 2C with three input pins (TCK, TMS, TDI) and one output pin (TDO). An exemplary interface includes a TAP controller, instruction register, instruction decoder, bypass register, boundary-scan register, and Device ID register. The TAP controller is a finite state machine triggered by the rising edge of clock TCK, in which the state is changed by the signals from the TMS pin. The outputs of the TAP include the clocks and control signals for each register. Hence, with the help of the TAP controller, the test input vector can be scanned into a boundary-scan register, or an instruction code can be input into an instruction register.

From FIG. 2C, one can observe that the instruction register stores an instruction (e.g., SAMPLE, PRELOAD, EXTEST) and the instruction decoder interprets the instruction to produce a correct multiplexer signal to control the output. Correspondingly, the bypass register is the direct path between TDI, and TDO and if the bypass register is selected, the input gets directly connected to the output without affecting the on-chip system logic. The selected register is decided by the decoded output of the instruction register. Device ID register is an optional choice used for loading vendor-related information such as device-specific identification number. At any time, only one register can be connected from TDI to TDO.

The IEEE Std. 1149.1 TAP controller is a 16-state finite state machine (FSM) clocked on the rising edge of TCK, in which the TAP controller uses the TMS pin to control the JTAG operation. In accordance with the present disclosure, an exemplary authentication method measures the current during data transmission through the hard-wired BSC path, which is used to generate a unique signature for each IC and PCB. As such, the TAP controller can be forced into a proper state by holding signal ShiftDR as shown in FIG. 2B, so that the ScanIN signal gets connected to the input of the capture register. In addition, a proper instruction can be loaded into the instruction register to allow the results of BSCs to be taken out serially through TDO. As a result, all the capture registers in BSCs can work as a shift register chain. In the SHIFT_DR state, the test data registers can shift data from one stage toward its serial output on the rising edge of TCK. Hence, the test vector can be scanned into the capture registers of BSCs. Among all the mandatory instructions, EXTEST is used to test the connections of ICs on a PCB; SAMPLE takes a snapshot of the regular operation for the component; and PRELOAD makes the data load onto the output of boundary-scan register in parallel. For all of them, the test data can be shifted into the boundary-scan register serially through PI and the test result can be shifted out through PO. Hence, the delay measurement of BSC paths is completed when the TAP controller is in the SHIFT_DR state and one of the above instructions is loaded into the instruction register.

Figure 3A:
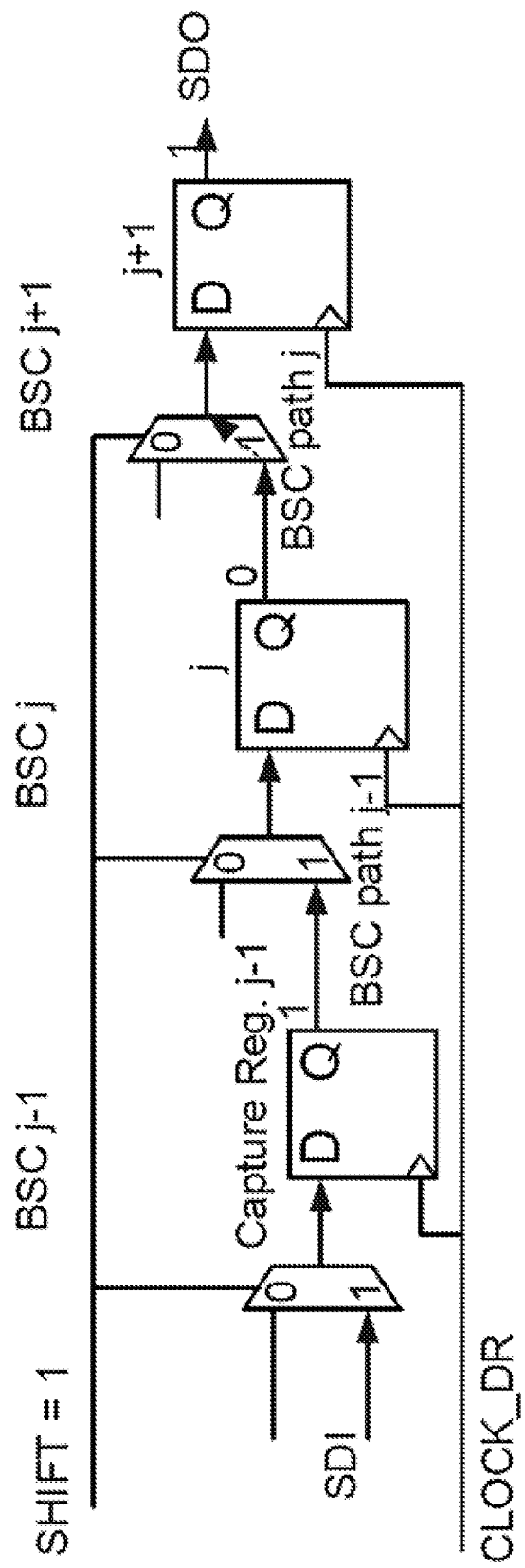
FIG. 3A is a schematic illustrating an interconnection of BSCs during a SHIFT_DR state as part of an exemplary delay-based authentication scheme in accordance with various embodiments of the present disclosure.
Figure 3B:
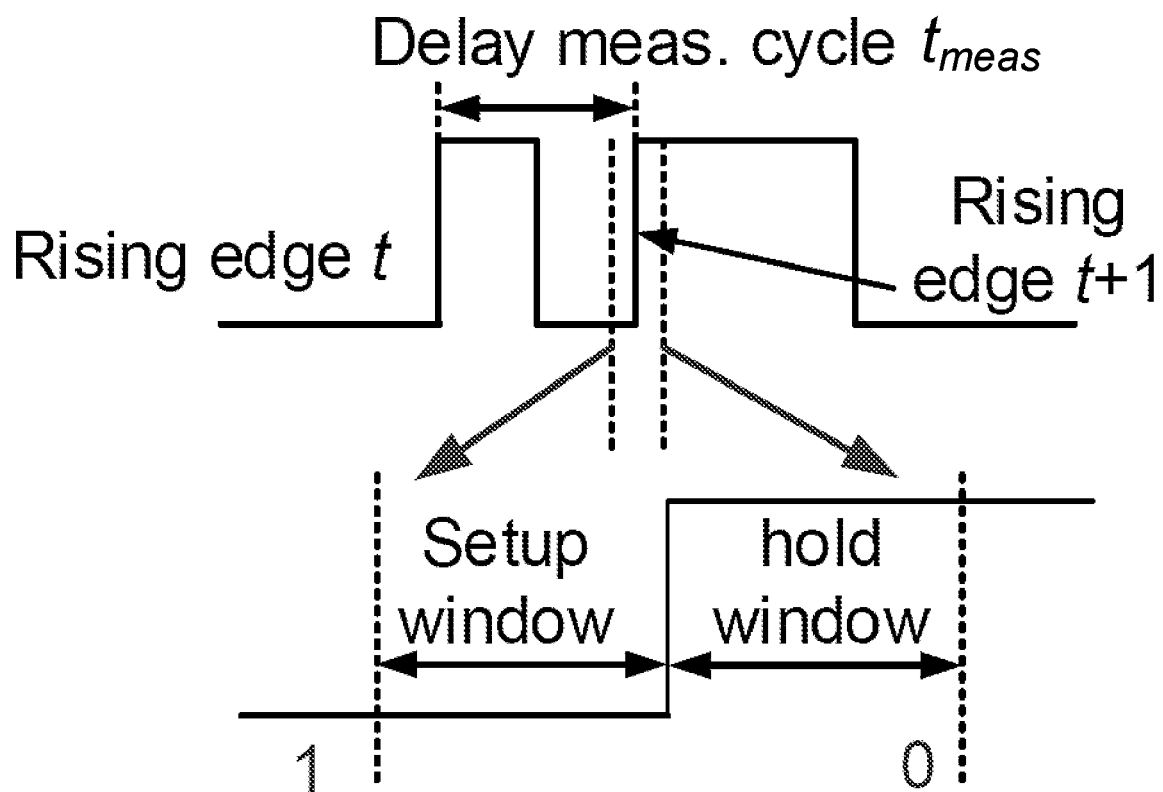
FIG. 3B shows a clock pulse for a precise BSC path delay measurement of an exemplary delay-based authentication scheme in accordance with various embodiments of the present disclosure.

In various embodiments, parallel scan delay measurement (PSDM) is used to measure delay values of the BSCs, in which only the connected signal paths are extracted. FIG. 3A elucidates the network of a BSC in a SHIFT_DR state, where the output of $BSC_{j-1}$ is connected with an input of $BSC_j$. In the PSDM algorithm, $BSC_j$ is initialized to 0 and is changed to 1 on the rising edge t of the clock signal Clock DR, which is derived from the external TCK clock signal to generate a 0→1 transition on the BSC path j. After an interval of $t_{meas}$, the rising edge t+1 is shown in FIG. 3B. If the uncertainty window caused by setup and hold is ignored, the output (O) of BSC j+1 can be simplified as:

$$O_{j+1} = \begin{cases} 1 & t_{meas} \geq d_j \\ 0 & \text{otherwise} \end{cases}, \quad (1)$$

where $d_j$ is the delay of BSC path j. If we define the resolution of $t_{meas}$ as $\Delta t$, the minimum period of $t_{meas}$ as $t_{init}$, and k as the switch point of path j, then $t_{meas}=t_{init}+k\Delta t$ and $t_{meas}=t_{init}(k+1)\Delta t$ leads to $O_{j+1}=0$ and $O_{j+1}=1$ respectively. The delay of path j can be estimated as:

$$d_j=t_{init}+(k+k+1)\Delta t/2=t_{init}+(k+0.5)\Delta t. \quad (2)$$

An exemplary procedure of PSDM is shown in Algorithm 1 (below).

---

Algorithm 1: The procedure of PSDM

---

Input: The selected $N_{path}$ boundary scan paths
Initialization: $t_{meas} \leftarrow t_{init}$, sw_num $\leftarrow$ 0 and k $\leftarrow$ 0
  while (sw_num < $N_{path}$)
    Generate 0 → 1 transition on all selected boundary scan paths after the rising edge t.
    Produce the rising edge t + 1 after $t_{meas}$.
    Identify $sw_k$ new switch points.
    sw_num $\leftarrow$ sw_num + $sw_k$
    $t_{meas} \leftarrow t_{meas} + \Delta t$
    k $\leftarrow$ k + 1
  end of while
Output: Path delays as Eqn. 2.

---

Initially, $t_{init}$ should be less than the minimum delay of all BSC paths to be measured in Algorithm 1. Consequently, switch points, sw_num are initialized to zero. In each iteration, the delay-measurement cycle of $t_{meas}$ identifies a switch point, sw among the total BSC paths, $N_{path}$. The switch point number, sw_num is increased by sw. If sw_num is less than $N_{path}$, the algorithm goes into a subsequent iteration with k←k+1 and $t_{meas}\leftarrow t_{meas}+\Delta t$; otherwise Algorithm 1 ends and computes the delays following Eqn. 2.

Figure 4:
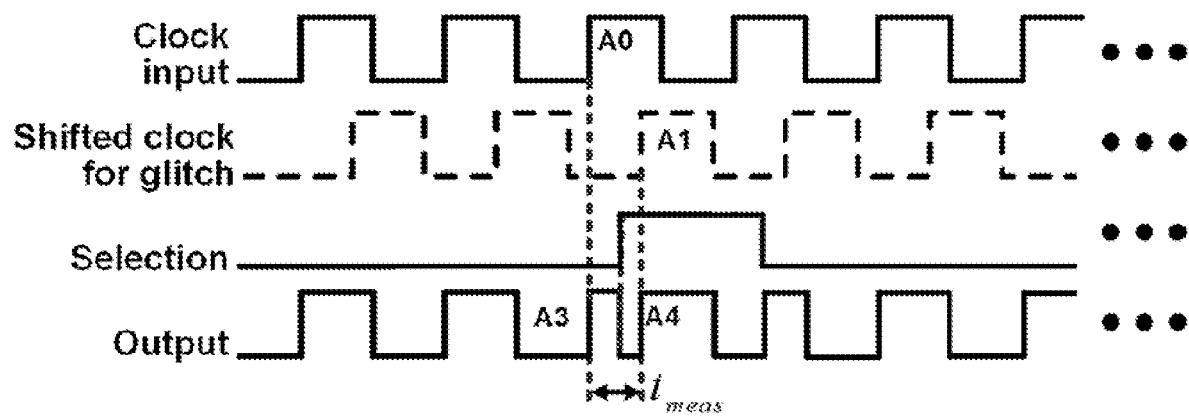
FIG. 4 shows a delay-measurement cycle obtained by a phase difference of input clock and shifted clock during an exemplary delay-based authentication scheme in accordance with various embodiments of the present disclosure.

Two clock signals are used with a programmable phase shift to insert a tunable delay-measurement cycle, $t_{meas}$, which was previously reported for generating a glitch clock for a fault injection attack. FIG. 4 portrays the generation of a delay-measurement cycle by the switch between the input clock and the shifted glitch clock. In the beginning, the output clock is connected with the input clock. The rising edge in the output clock is generated by the rising edge of the input clock. When a selection signal is inserted, the output clock is switched to the shifted glitch clock and becomes zero. Then, a delay-measurement glitch is formed when the shifted glitch clock reaches the rising edge. The delay measurement window, $t_{meas}$, can be adjusted with the phase difference between the input clock and the shifted glitch clock and $\Delta t$ is determined by the resolution of the glitch shift phase step.

PUF-based authentication protocol is applied for the JTAG-oriented authentication, which includes challenge enrollment and signature generation phases. The locations of BSCs are considered as challenge vectors. Usually, a modern IoT (Internet of Things) device contains several hundred to thousands BSCs, which can provide a large number of challenges. After obtaining all $d_{i,j}$ in Eqn. (2), the nominal delay, $D_j$ of path j can be estimated by averaging over all the test PCBs, $N_{pcb}$, as $D_j=\Sigma_{i=1}^{N_{pcb}}d_{i,j}/N_{pcb}$. All paths are classified into multiple groups according to the nominal delay and in each group, one bit of the signature can be generated based on the relationship of $d_{i,j}$ and $d_{i,j'}$ as follows, where j≠j':

$$s = \begin{cases} 1 & d_{i,j} \geq d_{i,j'} \\ 0 & \text{otherwise} \end{cases}. \quad (3)$$

All of the comparison pairs, i.e., path locations along with the signature are stored in the database of each device. The manufacturer can select the PCB-specific BSC paths to generate a high-quality signature for each PCB, since not all of the PCBs will have the exact same set of robust BSC paths. Eqn. (3) is similar to the signature generation of RO-PUF. The only difference is that RO-PUF requires each ring oscillator to be identically implemented, with the same nominal frequency. However, in an exemplary signature generation method, all of the stable BSC paths can be employed as the source of signature generation. As a result, an exemplary signature generation method incorporates all of the stable BSC paths to generate a high quality signature.

Figure 5:
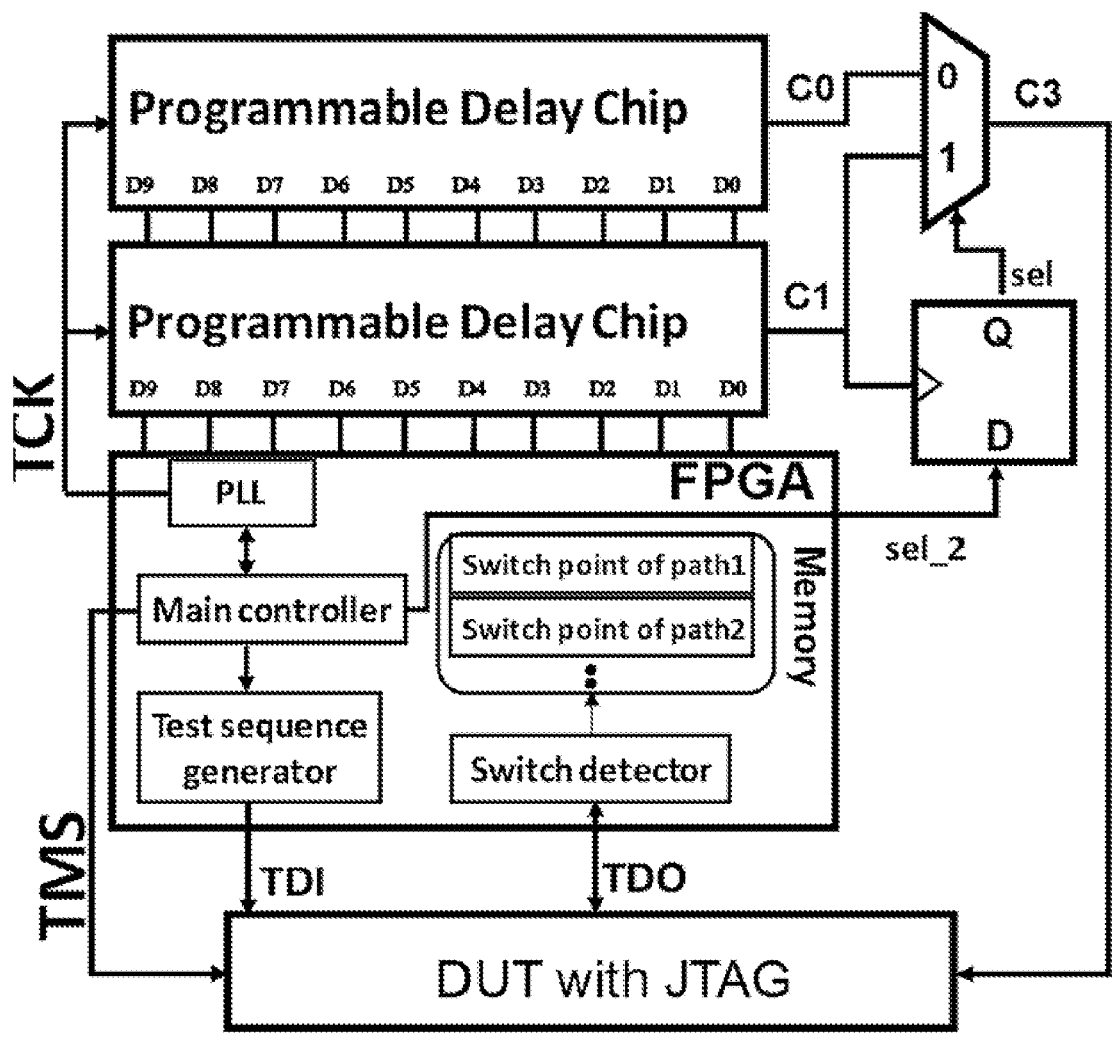
FIG. 5 depicts a schematic of an exemplary delay-based authentication system using JTAG architecture in accordance with various embodiments of the present disclosure.
Figure 6:
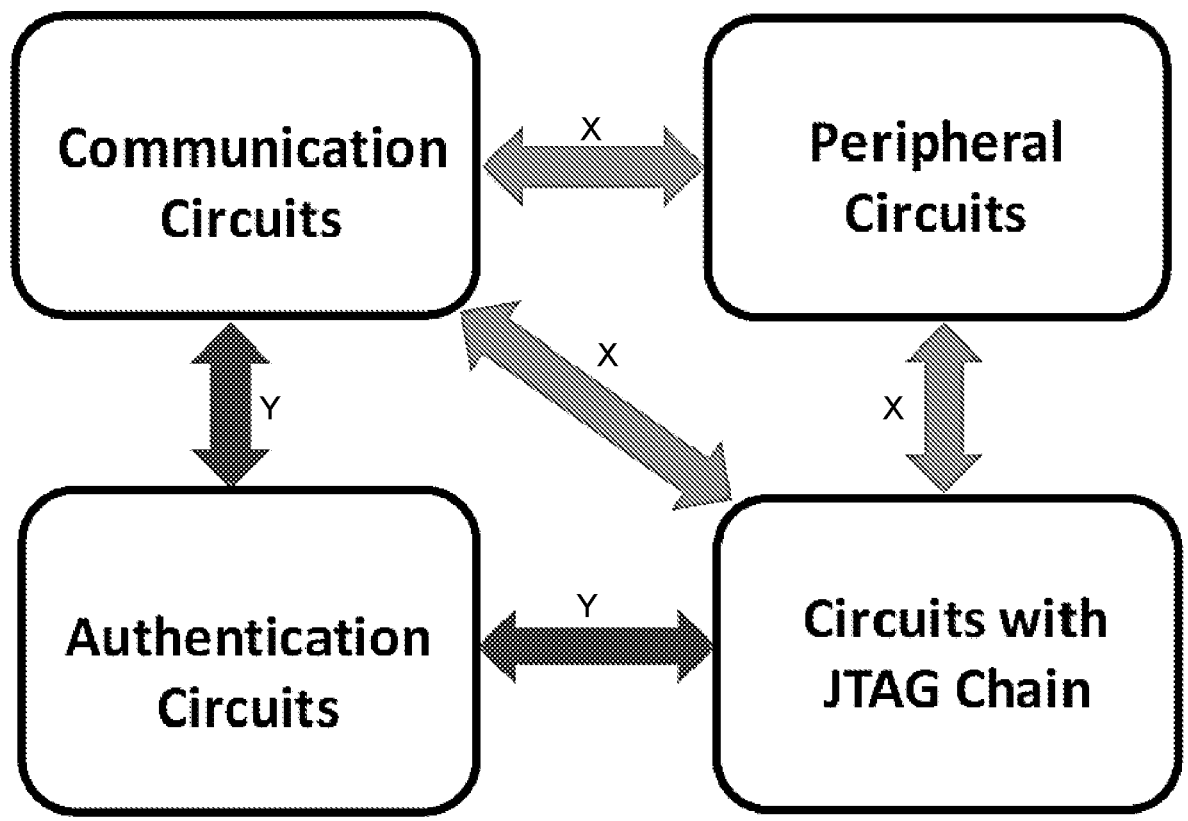
FIG. 6 depicts a block diagram indicating hardware overhead and additional signal paths (denoted by Y) after embedding an exemplary delay-based authentication circuit as compared to an original design in accordance with various embodiments of the present disclosure.

The architecture of an exemplary JTAG-based authentication is depicted in FIG. 5 that includes a control circuit, delay measurement circuit, and DUT. Compared to the original IoT hardware design, only the designed delay measurement circuit is added without any change to other existing circuits for which the block diagram of the whole setup is shown in FIG. 6. While the arrows indicated by an X represent the signal channel in the original design, the arrows indicated by a Y represent the additional signal paths after embedding the authentication circuit to the original design. In various embodiments, the delay-measurement circuit can be integrated to a single IC for better performance and scaling. A PCB layout of an exemplary delay measurement circuit uses commercially available ICs and an actual experimental setup includes the controller, delay measurement PCB, and DUT, in which a custom-designed PCB is fabricated by a commercial vendor for $t_{meas}$ generation to implement the schematic depicted in FIG. 3B. Emitter-coupled Logic (ECL) based high-speed programmable delay chips (MC10EP195) from ON Semiconductor are used to facilitate programmable delay lines of a differential ECL input transition with a step resolution of 10 ps and a delay range between 2:2 ns to 12:2 ns. The periods of input, shifted clock, and output clock are 100 ns. Delay controlling is implemented by an FPGA through parallel configuration ports. 2 MC10EP195 chips are used to compensate for the fixed minimum delay of these chips. Considering the different logic levels between ECL and CMOS, the LVPECL→LVCMOS and LVMOS→LVPECL translators are used to convert the logic level. The whole setup includes oscilloscope, authentication controller, and DUT (Design Under Test). An FPGA (Cyclone III EP3C16F484) operates as the main controller for test pattern generation, control signal provision, and post-processing. The test pattern was designed to generate an 0→1 or 1→0 transition on the BSC paths while the post-processor identified the sw of each path and stored them in the embedded RAM. The authentication method required no additional modification to the IC design and test. This means that an exemplary authentication method can be implemented into any IC equipped with JTAG. For measurement purposes, twenty custom Hardware Hacking (HaHa) PCBs are used as DUTs in the experimental setup. Accordingly, an Atmel ATmega16U4 microcontroller and a MAX10 FPGA are linked with the same BSA with total of 845 BSCs, and almost all BSC paths are employed to construct a large C-R space.

Figure 7A:
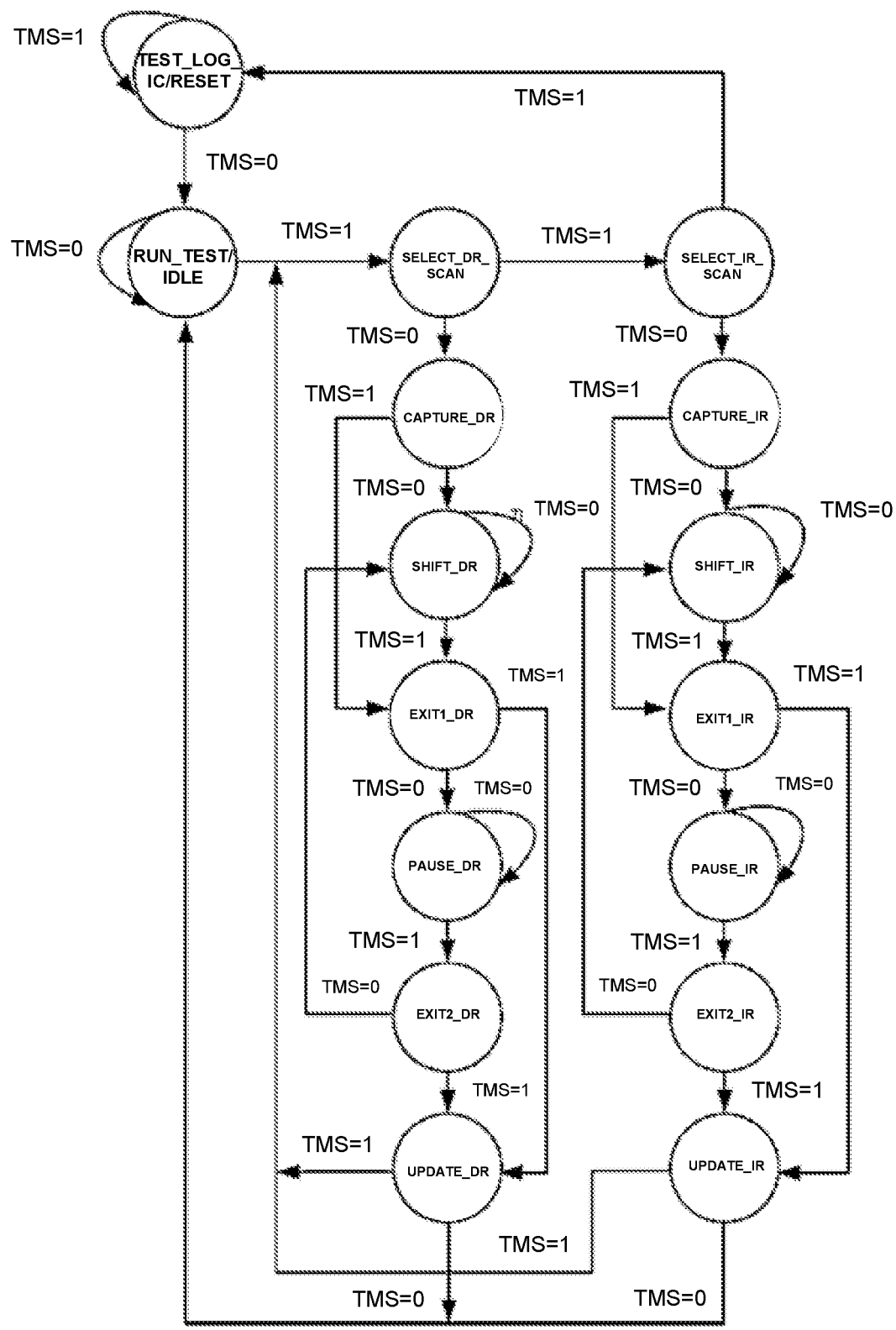
FIG. 7A shows a state machine of a JTAG TAP controller and related steps that enable a SHIFT_DR state as part of an exemplary current-based authentication scheme in accordance with various embodiments of the present disclosure.

For an exemplary current-based authentication scheme, it can be noticed from the state machine of FIG. 7A that the TAP controller can be forced to the TEST LOGIC/RESET state by holding the TMS pin high for five consecutive TCK clock cycles. The state machine of the JTAG tap controller can be split into two different sections: one for handling the instruction register and the other for interfacing with the data register. After TMS is forced as 0, 1, 1, 0, and 0, the state machine goes to a SHIFT_IR state in which the binary code of instructions can be shifted into an instruction register through the TDI. The mandatory instruction code can then be shifted into the instruction register. After decoding, the BSCs are placed between TDI and TDO. The second step is to switch the state of the TAP controller from SHIFT_IR to SHIFT_DR. Similarly, TMS inputs can be set as: 1, 1, 1, 0, and 0 in the following five clock cycles to make the state machine reach a SHIFT_DR state, which begins at the third step to shift the test pattern via the TDI pin. The TMS sequence controls the operation of the chips connected in the scan chain, and this feature can be exploited to activate different chips at different times and perform measurements accordingly.

Figure 7B:
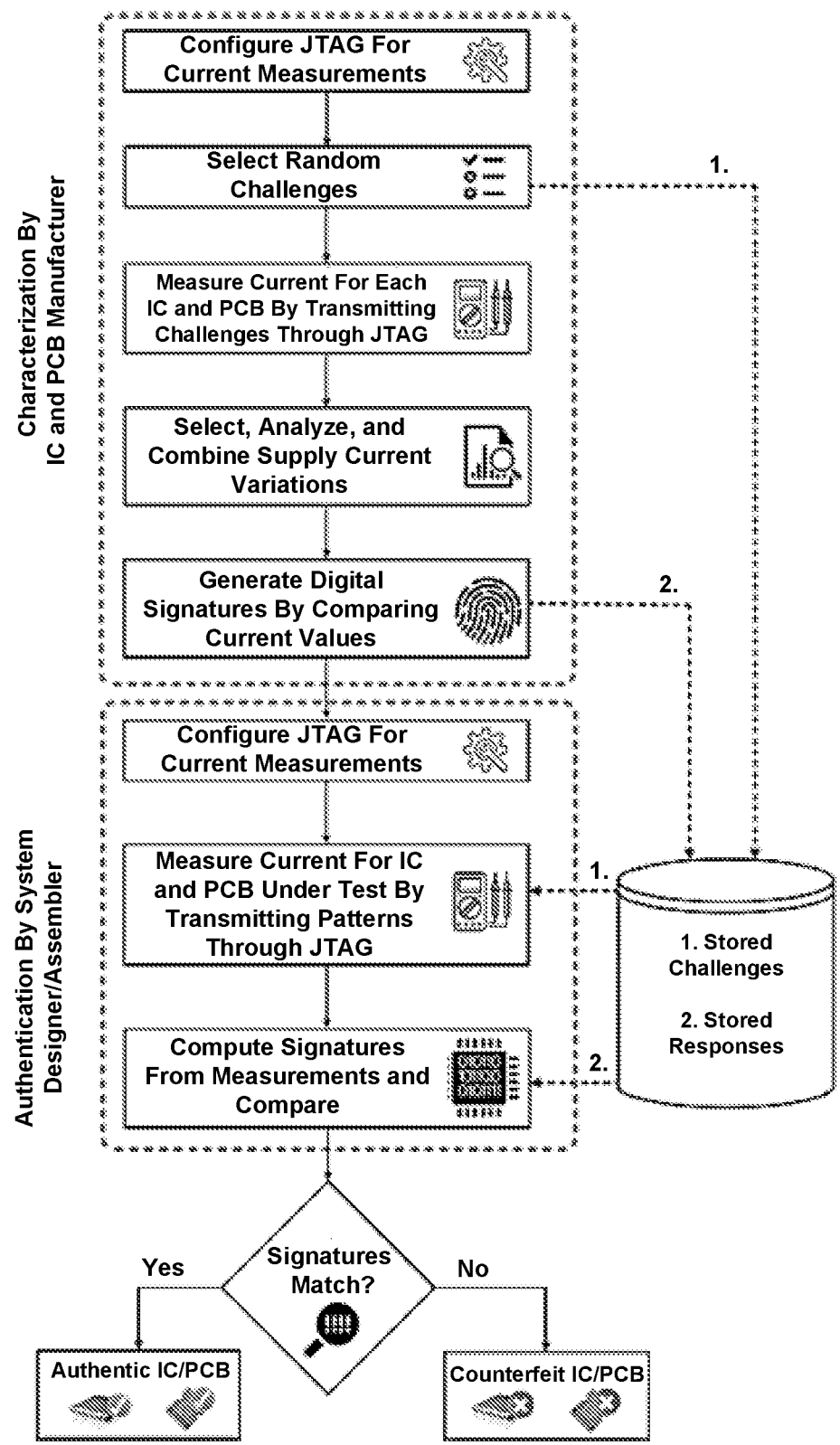
FIG. 7B depicts a flow chart of an exemplary current-based authentication scheme using JTAG architecture and chip & PCB level current measurements in accordance with various embodiments of the present disclosure.

Correspondingly, an exemplary current-based authentication scheme using JTAG-based current measurement is illustrated in FIG. 7B. In this process, the first step is to configure the JTAG in a way that it can accept a test pattern at a TDI port and transmit the test pattern through the boundary scan chain and be outputted from the TDO port. After achieving this configuration, a manufacturer can measure the current for each IC and the whole PCB by applying random test patterns. These current values can be utilized to generate IC and PCB specific fingerprints. On the assembler/user's side, the system can be configured in the same way and hence a group of selected patterns can be passed through to measure the current and produce corresponding digital signatures. These signatures can be compared to the respective information stored in the database and authentication decision can be reached based on the comparison results, as depicted in FIG. 7B.

Figure 8A:
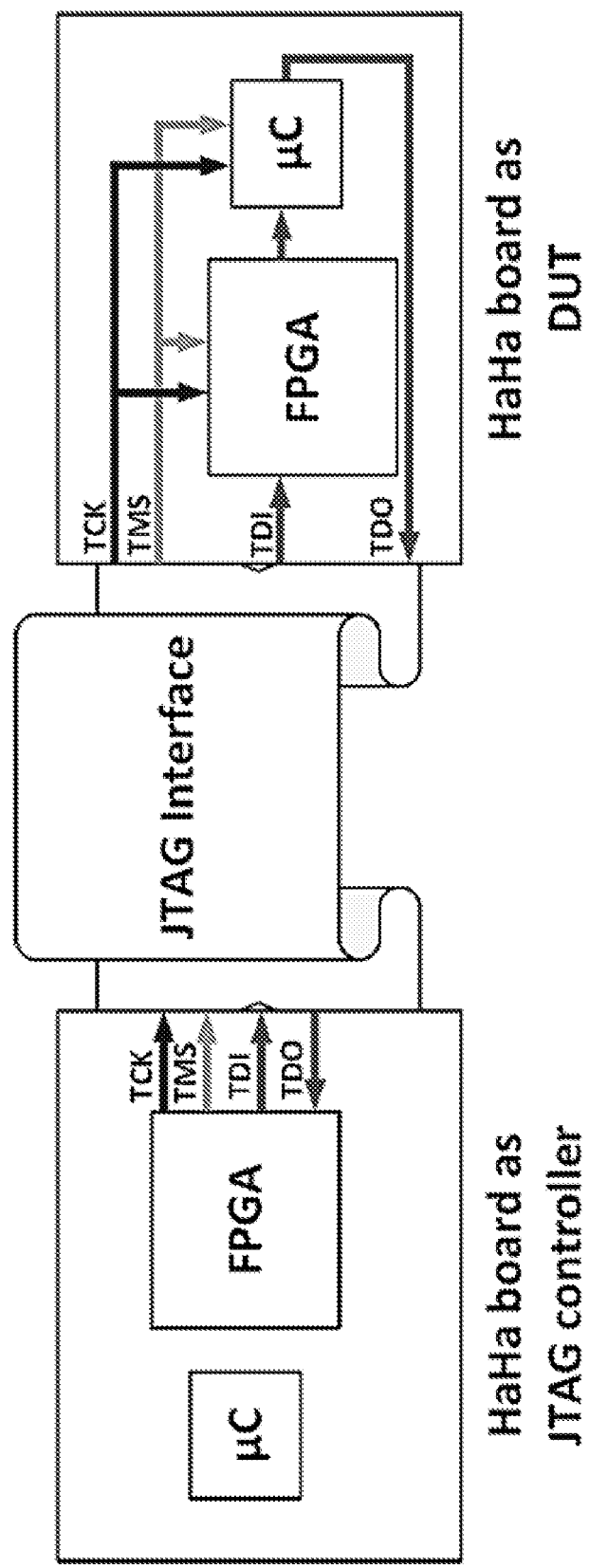
FIG. 8A shows a connection diagram for implementing an exemplary current-based authentication scheme using JTAG architecture in accordance with various embodiments of the present disclosure.
Figure 8B:
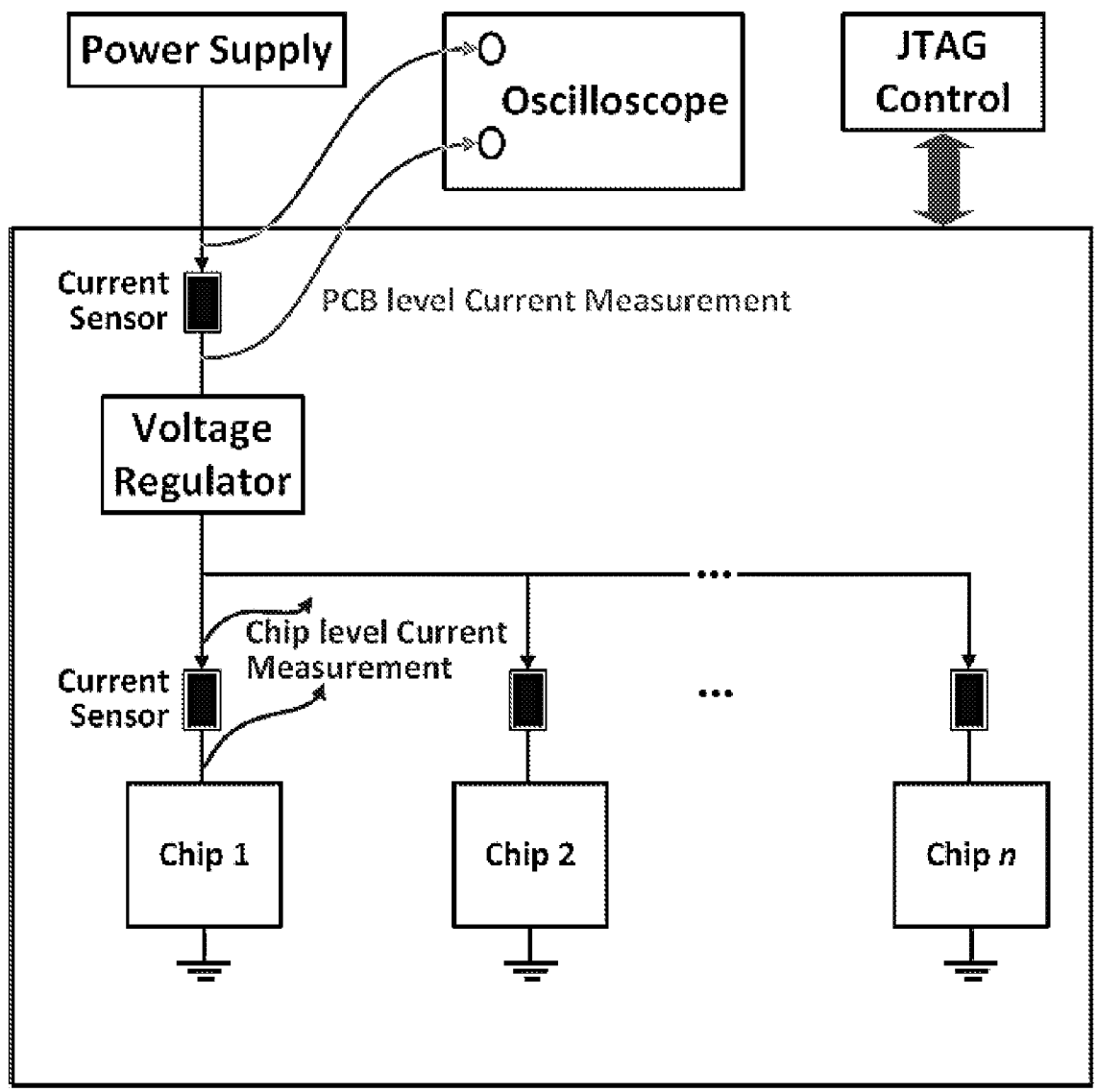
FIG. 8B shows a chip and PCB level current measurement setup for a PCB utilizing an exemplary current-based authentication scheme in accordance with various embodiments of the present disclosure.

FIGS. 8A-8B shows an implementation and measurement setup for an exemplary current-based authentication scheme using JTAG architecture. In one embodiment, an exemplary current-based authentication method is implemented in the HaHa platform, where one HaHa board is used as the JTAG controller and another board is used as the device under test (DUT). As depicted in FIG. 8A, these two boards can be connected using the JTAG interface. Each board contains an FPGA and a microcontroller internally connected to its respective boundary scan chain. The JTAG controller board generates the test specific control sequence and test patterns to pass them through the JTAG interface. The JTAG interface contains a total of four wire connections: TCK, TMS, TDI, and TDO. The TCK is the dedicated test clock to perform different tests on DUT at any convenient frequency, TMS is the serial input signal, TDI is the serial test data in, and TDO is the serial test data out, which is only active during a shift operation. On the DUT side, out of these four signals, TCK and TMS are common for both the FPGA and microcontroller chips. The TMS signal can be used to decide which chip will be activated and which chip will be bypassed. Accordingly, the TMS signal facilitates the fine-grain control of the components present in the PCB. After selecting the test chips with the TMS signal, the test pattern is transmitted through the TDI, and after traversing the boundary scan chain, the pattern comes out from the TDO pin. During this shifting of the test data, the DUT is connected to a measurement device to measure and collect current values.

An experimental measurement setup is elucidated in FIG. 8B. The figure shows a PCB that includes a boundary scan chain, which can be accessed and controlled externally using JTAG. The board has multiple chips connected with the BSA, and an external power supply provides the necessary voltage to operate the PCB. The voltage regulator (VR) which is connected to the power supply distributes the supplied power to all the chips and other components present in the board. The board is designed in a way that for every chip there is a designated current sensor connected to the chip which can be used to measure the individual chip level current. Additionally, for measuring board-level current, a current sensor is also plugged in between the power supply and the VR. By using the JTAG chain, every chip in a PCB can be individually accessed and controlled. Accordingly, the JTAG chain and the measurement setup are used to measure current for each chip when they are activated. After measuring an individual chip-level current, a control signal is sent through JTAG to activate all the chips at the same time. Then, the real-time board-level current can be measured by hooking up an oscilloscope or any external measurement equipment across the PCB-level current sensor. As such, JTAG gives us the unique feature and flexibility to control and measure each component and utilize this trait to implement methods and systems of the present disclosure. JTAG-based PCB authentication uses a novel enrollment and signature generation method. An exemplary digital signature generation method is devised in a way that retains the uniqueness and robustness of each signature.

Figure 9A:
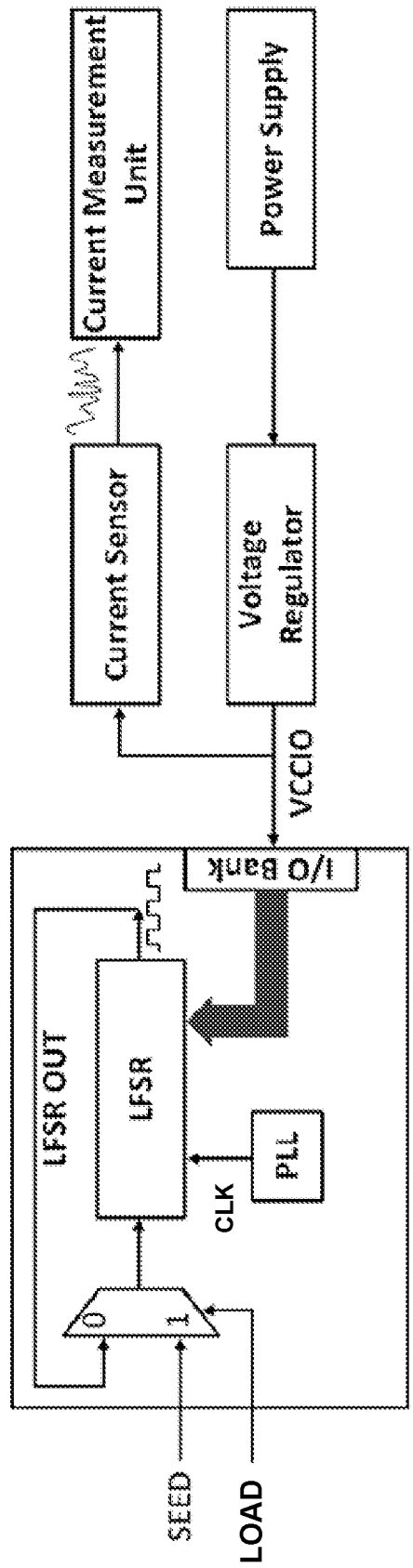
FIG. 9A depicts a flow chart of an exemplary current-based authentication scheme using JTAG architecture and chip & PCB level current measurements in accordance with various embodiments of the present disclosure.

FIG. 9A is a block diagram an exemplary current-based authentication system in accordance with various embodiments of the present disclosure. The core concept of the realization of the exemplary system is straightforward. In the embodiment of FIG. 9A, the heart of the system is an FPGA which has a number of internal I/O banks to be used. An exemplary PUF is implemented by mapping a 16 bit LFSR network into the FPGA. The selection of the taps and XOR-ing are executed ensuring a maximal length sequence. A 1 MHz pulse signal is used as the clock to the LFSR through a CLK input. This CLK signal is generated with the built-in IP Core function, ALTPLL of the Intel Quartus Prime software. A 16-bit seed is employed as the challenge vector to the PUF where each of the bits are fed in parallel to the FFs. This implementation uses only 21 logic elements (LEs) out of total available 49760 LEs of Intel MAX 10 chip (<1% overhead). To load the seed values into LFSR, a 1-bit control signal, LOAD, is used. When LOAD is set to 1, it loads the seed value to the LFSR, and when it is 0, the normal operation of LFSR is carried on as the output of the LFSR (LFSR OUT) is connected back to the input of LFSR as the feedback loop.

The on-chip I/O banks are powered through VCCIO pins of FPGA, and these pins are connected to the voltage regulator. Depending on the seed value or input challenge, the switching activity at I/O ports of LFSR changes as does the total current which is supplied through the voltage regulator. Thus, the switching activity is translated into a current value. In order to track the analog current fluctuation, a current sensor is deployed to the voltage regulator. Hence, the current sensor is connected to a current measurement unit to measure the total input current to FPGA.

Figure 9B:
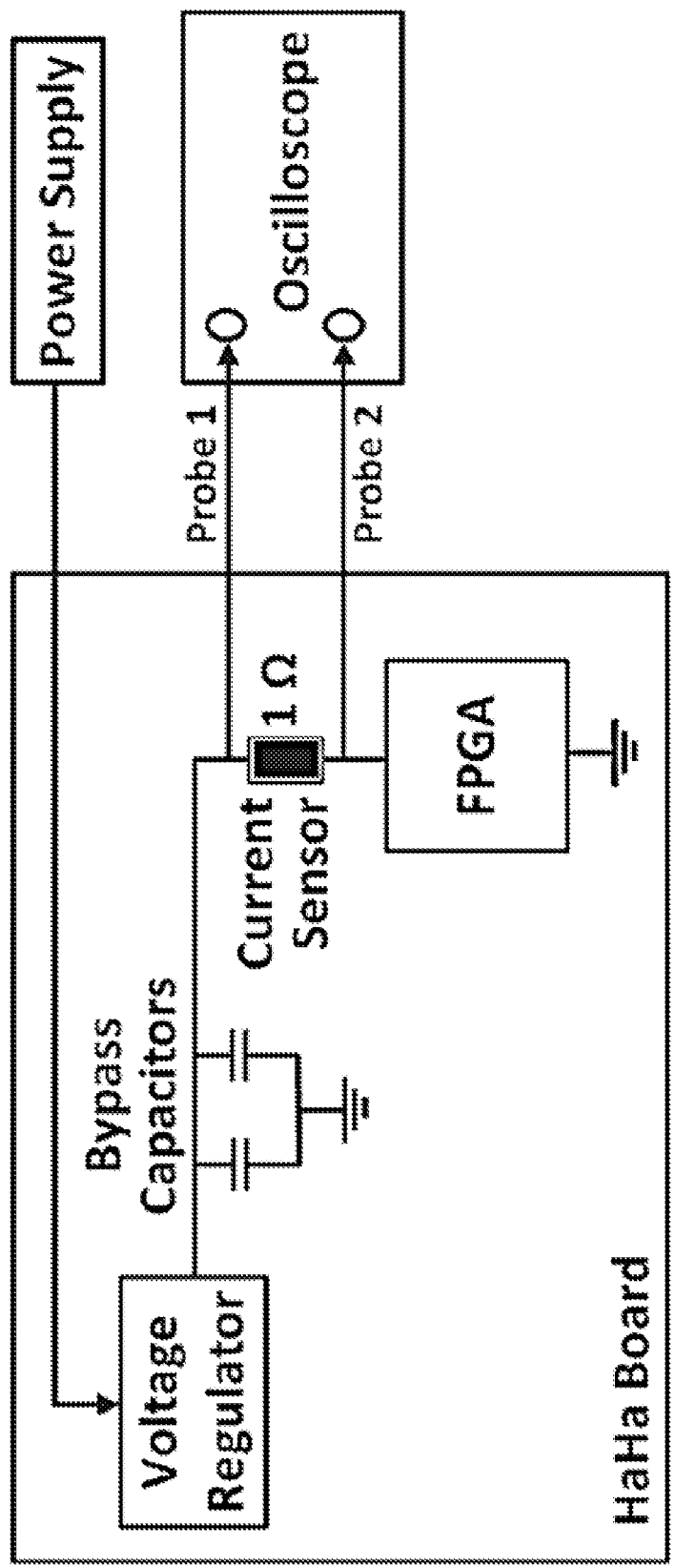
FIG. 9B is a block diagram of a prototype setup for the system of FIG. 9A.

Next, setup and components for the measurement of an exemplary PUF implementation are discussed. Accordingly, FIG. 9B depicts a block diagram of a prototype setup. For this exemplary system, the system is implemented on 20 different MAX10 ICs of 20 different HaHa boards and current measurement is performed with a Tektronix MSO 2022B mixed-signal oscilloscope at a data acquisition rate of 1 GSa/s, in which a 256 waveform averaging is executed in the oscilloscope to minimize the effect of white Gaussian noise. Additionally, ten instantaneous readings are taken and hence averaged to fend off random measurement noise and increase the accuracy & reliability of measured values. For each IC, this process is repeated for 100 randomly selected challenge vectors, and the whole procedure is repeated for the 20 ICs with the same set of 100 challenge vectors. Correspondingly, FIGS. 10A-10D illustrate the fluctuations of current values across different ICs over various LFSR lengths. These variations are exploited by an exemplary PUF after performing current measurements and transforming the variations into unique and robust IC-specific signatures/CRPs, in accordance with embodiments of the present disclosure. The generated signatures can later be applied to authenticate the corresponding ICs.

As the DUT (Device Under Test), a HaHa (Hardware Hacking) board is used in a series of experiments. Powered by an Altera MAX 10 FPGA, the HaHa board is an extremely powerful platform to conduct hardware security related experiments. To observe the digital signals, the designated I/O pins are used. Besides I/O pins, the board has two current measurement pins (with a built-in 1Ω sense resistor) which are used to measure total input current to the FPGA.

As the collected data are analog, one way to generate the signature is to digitize individual current value directly. However, due to temporal variations like temperature or environmental noise, power supply fluctuations, etc., the analog value might change, which might result in a different signature value when measured over time. Accordingly, the inter-seed current variations can be compared over the entire challenge space for each IC and assign a digital value of '0' or '1' based on the corresponding comparison. An advantage of this is scheme is that some minute fluctuations in the seed-corresponding current values usually do not alter the overall signature itself. Another convenience of this comparison based signature generation scheme is: from N bit challenges, a total of $^{N}C_2$ signature bits can be generated, which means that this scheme results in an expeditious growth in signature length. For example, an average current vector I of length N can be denoted by $I=[I_1\ I_2\ \dots\ I_N]$. Now every current value, $I_i$, in the vector is compared with the other current values, $I_j$, where $1 \leq i \leq N$, $1 \leq j \leq N$, and $i \neq j$. Each comparison of a pair would generate a response bit and thus a vector of length N generates $^{N}C_2=N(N-1)/2$ response bits. The signature output bit, $S_{i,j}$ is defined as:

$$S_{i,j} = \begin{cases} 1 & \text{if } I_i > I_j, \text{ where } i \neq j \\ 0 & \text{otherwise} \end{cases} \quad (4)$$

Thus, applying this method for 100 challenges, 1200 bit long signatures can be obtained for each of the 20 ICs.

Figure 9C:
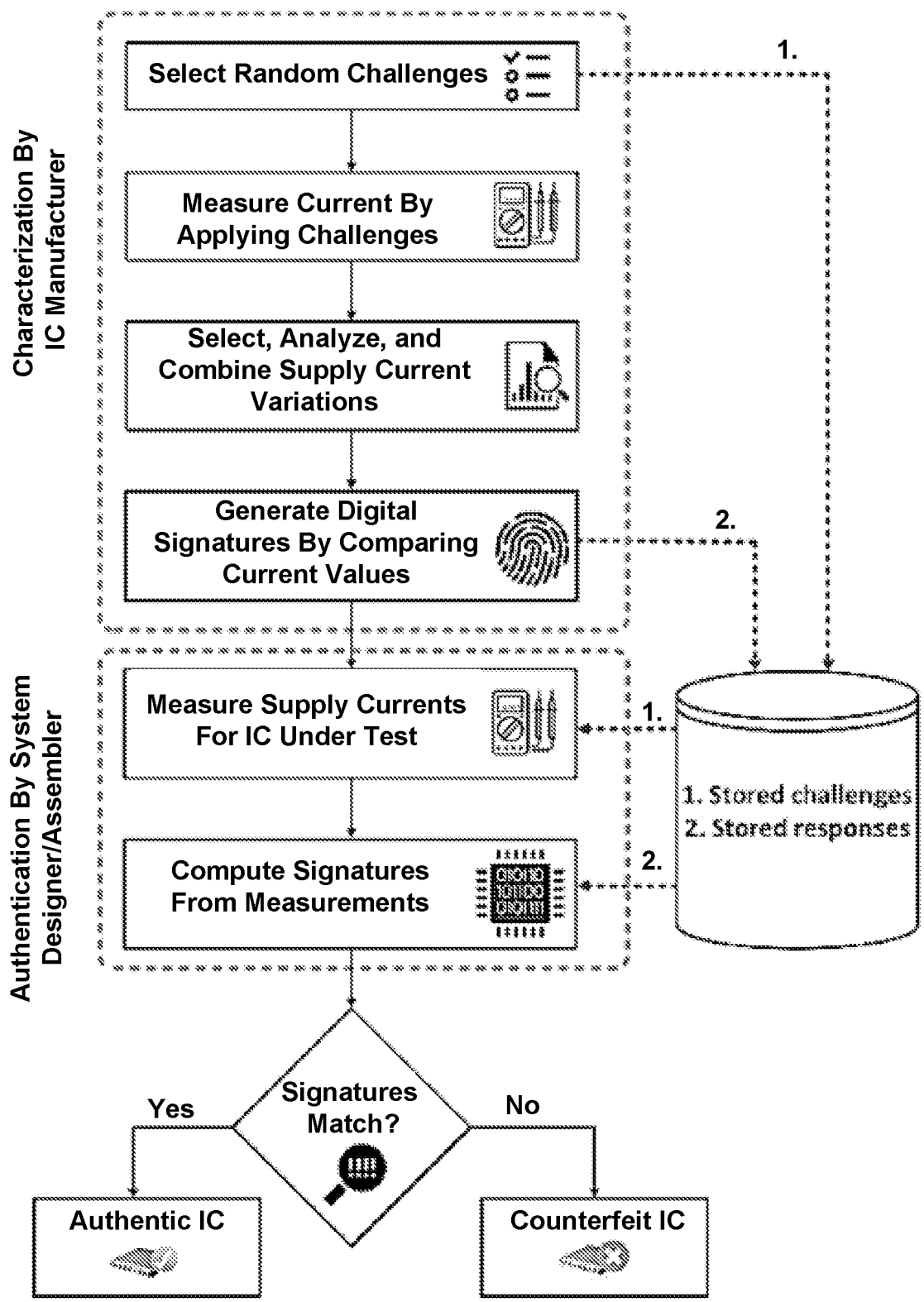
FIG. 9C depicts a flow chart of an exemplary current-based authentication scheme using JTAG architecture and chip & PCB level current measurements in accordance with various embodiments of the present disclosure.
Figure 10A:
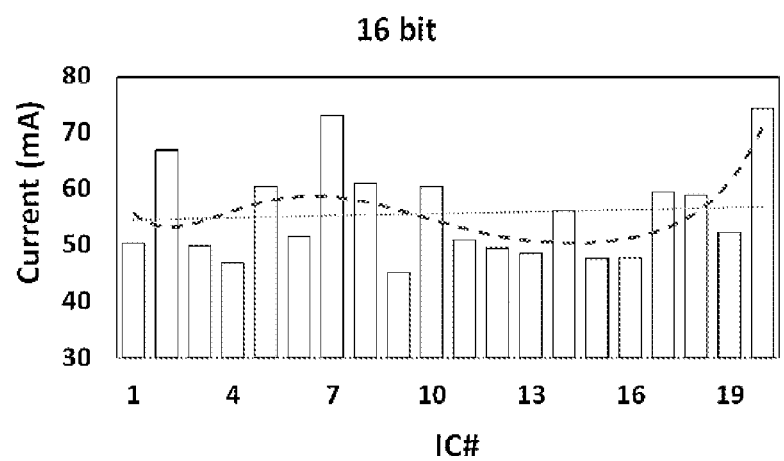
FIGS. 10A-10D are plots of current variations measured across different ICs for various LFSR (linear feedback shift register) lengths in accordance with the present disclosure.
Figure 10B:
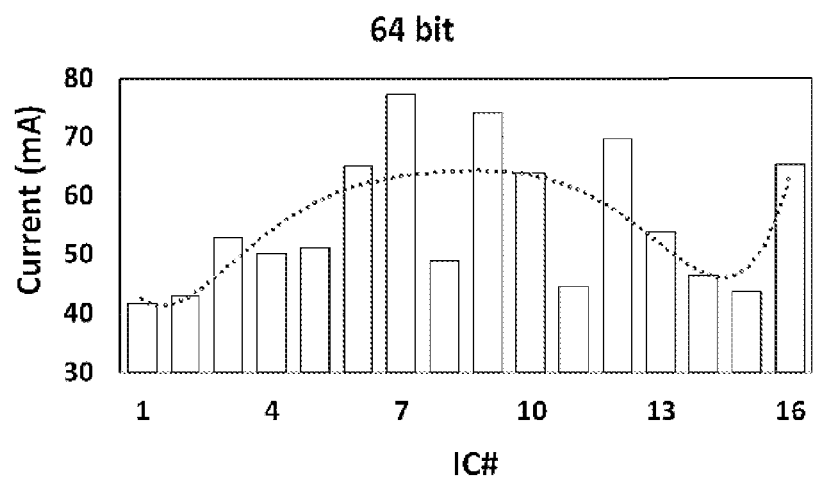
Figure 10C:
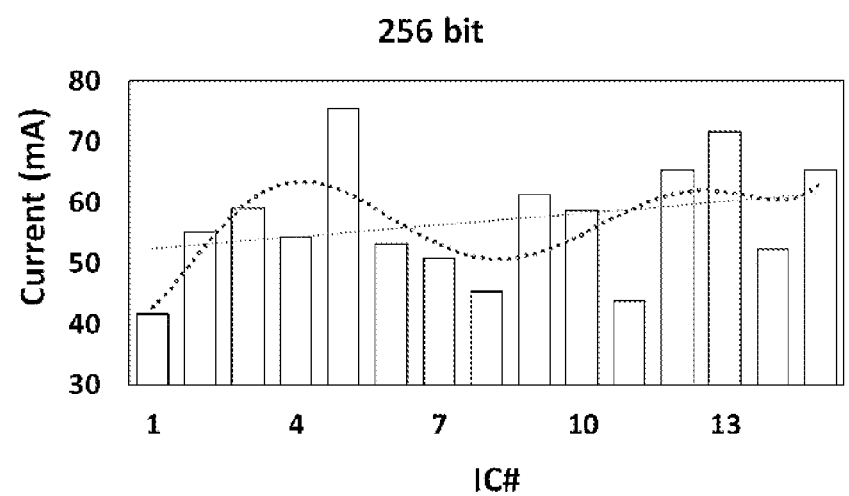
Figure 10D:
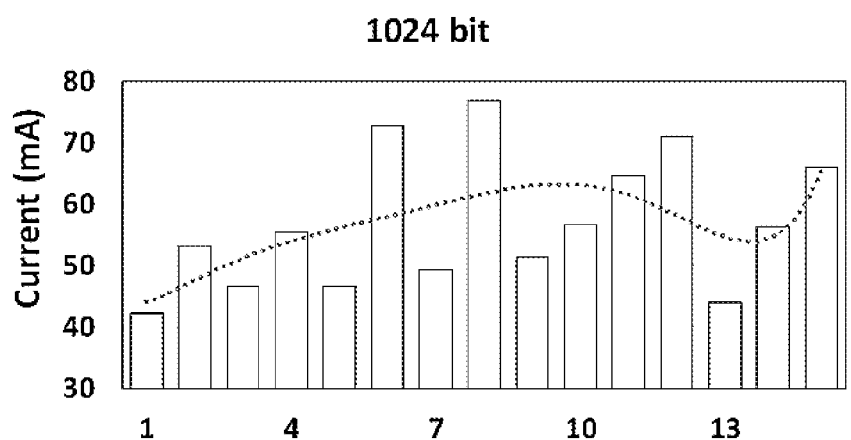

FIG. 9C illustrates steps of an exemplary current-based authentication method in accordance with various embodiments of the present disclosure. First, the IC manufacturer characterizes the manufactured chips by selecting challenge vectors and applies them to measure corresponding current values. The current values are then post-processed and analyzed to produce robust IC-specific digital signatures. All these challenge vectors and corresponding signatures are stored in the database of the manufacturer. At a later stage, the system designer applies the same challenge vectors obtained from the database, generates corresponding signatures, and compares them with the stored responses. If the generated signatures match with the database, the IC is determined to be authentic; otherwise, the IC is determined to be counterfeit.

Figure 11:
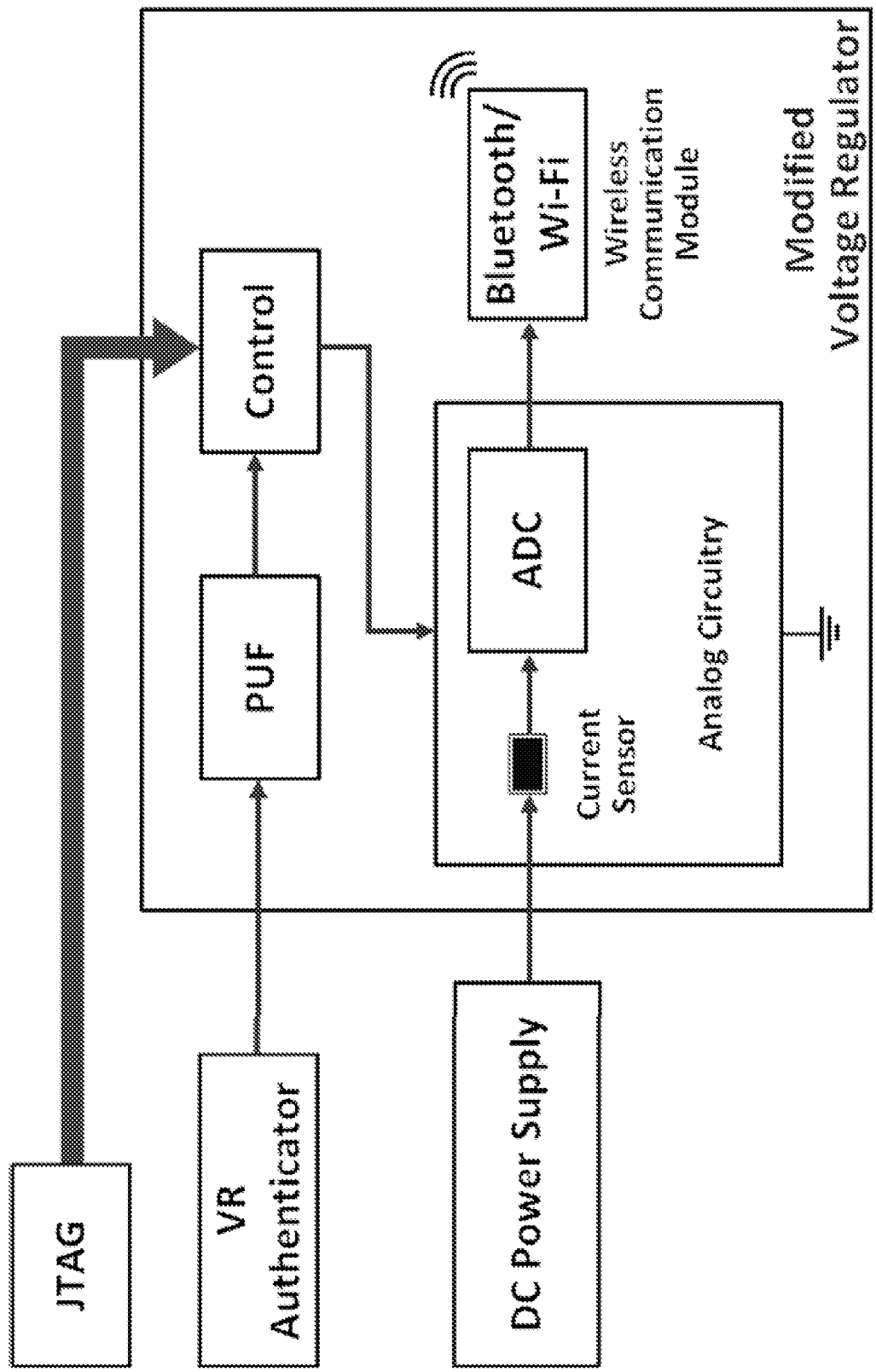
FIG. 11 is a block diagram of an improved voltage regulator (VR) in accordance with various embodiments of the present disclosure.

In accordance with the present disclosure, an exemplary current-based authentication system incorporates an improved voltage regulator. In general, the purpose of a conventional voltage regulator is to maintain a stable voltage level at the output within its specific input voltage range. However, if we want to deploy a commercially available VR, additional multiple external components are required, such as a measurement device, a communication module, etc. These external components add an extra cost in purchasing the components, and additionally, there is no way to know whether the measurement device or other components are trusted or not, which can impose a severe security issue. Accordingly, FIG. 11 shows an exemplary improved VR design that includes all the external components built inside the chip (besides the usual analog circuitry of a VR) and unifies all the functionalities together. Accordingly, the improved VR design includes PUF, JTAG Control, Current Sensor, Analog to Digital Converter (ADC), and Wireless Communication Module elements.

As discussed, above, in various embodiments, a built-in PUF is included in the improved VR. The purpose of the PUF is to ensure the authenticity of the VR chip itself. As previously discussed, the VR should be verified to not be counterfeit and to come from a trusted source. Accordingly, in various embodiments, before deploying the VR, the IC chip (on which the VR resides) is connected to a VR authenticator, and the VR authenticator sends a signal to the 'control' section of the chip. If the VR is authentic, the VR authenticator sends a control signal to carry out the rest of the on-chip operations. Otherwise, the control signal disables the functionality of other components or on-chip operations.

JTAG Control is also included in the improved VR. The JTAG control receives the notification from the PUF at the start and provides necessary instructions to all other VR chip components. For an authenticated VR, this part of the VR takes commands from the JTAG port to activate the analog circuitry accordingly. Further, an embedded current sensor captures transient current values during the IC and PCB authentication process, and an embedded ADC converts any analog values into a bitstream of binary '0's and '1's. After the analog current value is captured by the current sensor, this on-chip ADC transforms the analog values into sequences of a digital bitstream, which can be utilized as device-specific binary signatures. The addition of an embedded wireless module allows a target device to transmit digital signatures directly from the target device to any phone/mobile device (e.g., using a secure Bluetooth/Wi-Fi protocol).

The uniqueness of a PUF is the ability of particularly identifying a specific entity from others of the same type. The metric which is used to assess the uniqueness of a PUF is known as inter-class Hamming Distance (inter-HD). It is desired that, to single out a PUF entirely, the probability of getting a different response for the same challenge in different instances of similar kinds of PUFs must be high. For the same PUF, the same challenge (but for a different chip, ideally), the inter-HD (Hamming Distance) should be 50%.

Figure 12A:
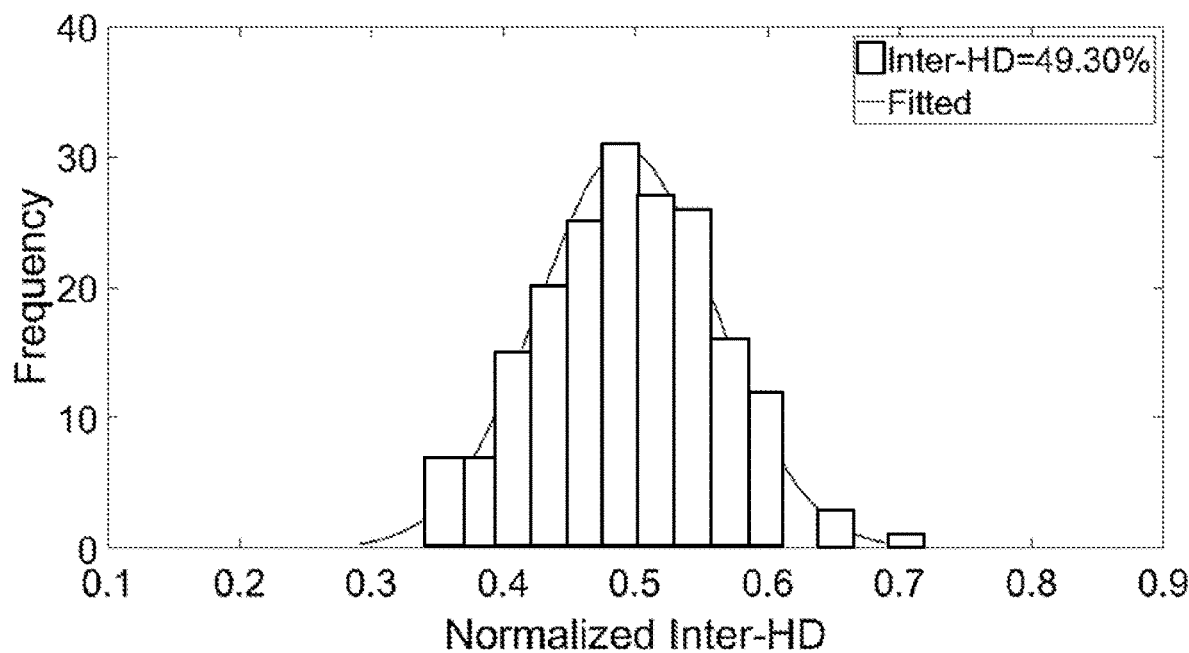
FIGS. 12A and 12B are respective plots of uniqueness and robustness results for 20 PCBs at nominal operating conditions for an exemplary current-based authentication system.

The average inter-HD is defined as:

$$Inter-HD_{Avg} = \frac{2}{k(k-1)} \sum_{i=1}^{k-1} \sum_{j=i+1}^{k} \frac{HD(R_i, R_j)}{n} \times 100\%, \quad (5)$$

where $R_i$ and $R_j$ are n-bit response vectors from $i^{th}$, and $j^{th}$ chip (i≠j) for the challenge C and k is the total number of chips evaluated. For an exemplary authentication system using a current PUF, experiments were performed on 20 different MAX10 ICs of 20 different HaHa boards and analog current values for different challenges were measured. FIG. 12A shows the inter-HD histogram based on the generated signatures for the 20 ICs and PCBs at nominal operating conditions (T=25° C., $V_{Supply}$=3 V) such that the inter-HD histogram is centered around 49.3%.

Figure 12B:
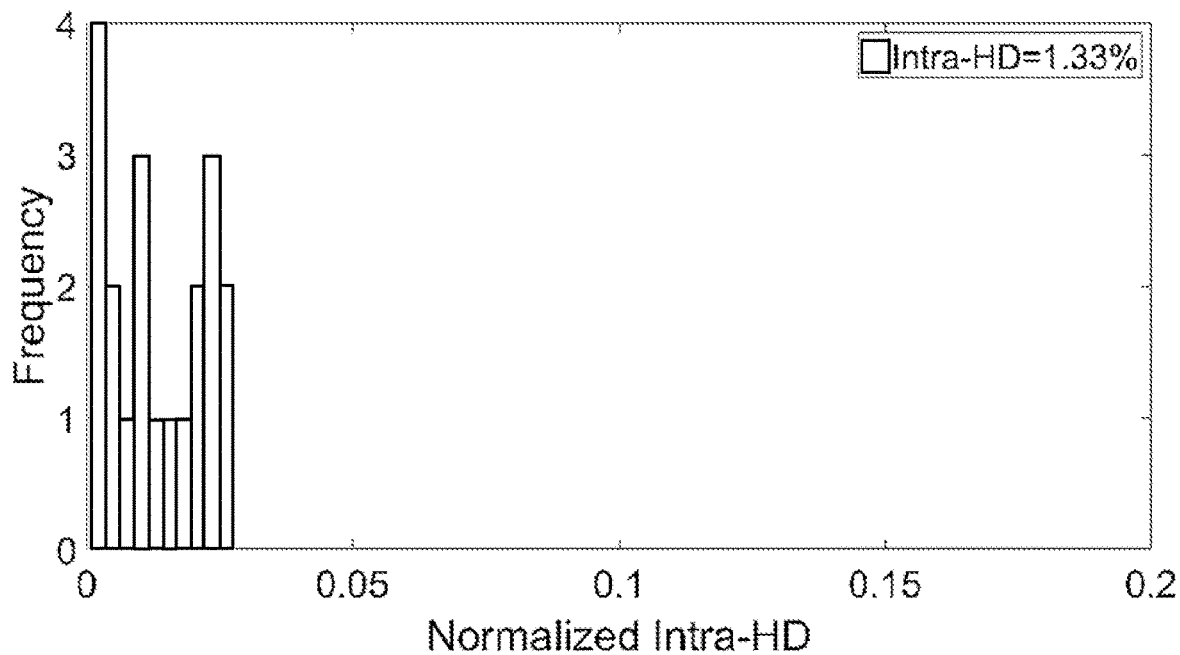

Robustness, also known as signature reproducibility, is a measure to determine whether a signature can be regenerated after applying environmental variations (such as temperature, supply voltage, etc.) and is gauged by intra-chip HD. Robustness implies that for the same challenge using the same instance of PUF, the probability of getting different responses must be very small. Thus, depending on the environmental variations, the PUF responses should not change. In an ideal case, for the same PUF and the same chip (if the exact same challenges are applied), the intra-HD should be 0%. The intra-HD is expressed as:

$$Intra-HD_{Avg} = \frac{1}{k} \sum_{i=1}^{k} \frac{HD(R_{i,1}, R_{i,2})}{n} \times 100\%, \quad (6)$$

where $R_{i,1}$ and $R_{i,2}$ are the k-bit response vectors from the $i^{th}$ chip due to the challenge C for 1st and 2nd measurement, respectively. The average intra-HD is calculated by averaging the accumulative responses over n different chips. Accordingly, FIG. 12B shows the intra-HD histogram based on the generated signatures at nominal operating conditions (T=25° C., $V_{Supply}$=3 V), in which two sets of current measurements are taken over 20 different ICs and PCBs for the same input challenge and corresponding signatures are generated such that the intra-HD histogram is centered around 1.33%.

One of the salient features of the Hardware Hacking (HaHa) PCB is that it contains the on-board FPGA on a removable socket, where the FPGA can be replaced based on the necessity of the user. The HaHa board allows for the performance of experiments of intentional alteration/tampering to verify whether an exemplary method can successfully detect/authenticate the changes in the boundary scan chain. Some of the major attacks at the PCB level include where the opportunistic parties perform in-field alteration/tampering, such as mounting/soldering components to the JTAG interface. The sole purpose of this type of tampering is to gain unauthorized access or bypass the built-in authentication process, or to replace on-board chips with counterfeit ICs. As a result of these attacks, (1) the unaffected components will generate the same digital signatures, and (2) because of the minute changes in the boundary scan architecture, the signature of the whole board will change drastically. The latter effect is similar to the situation when a genuine PCB being attacked will be considered as a different/new PCB in terms of security/PUF metrics.

Figure 13A:
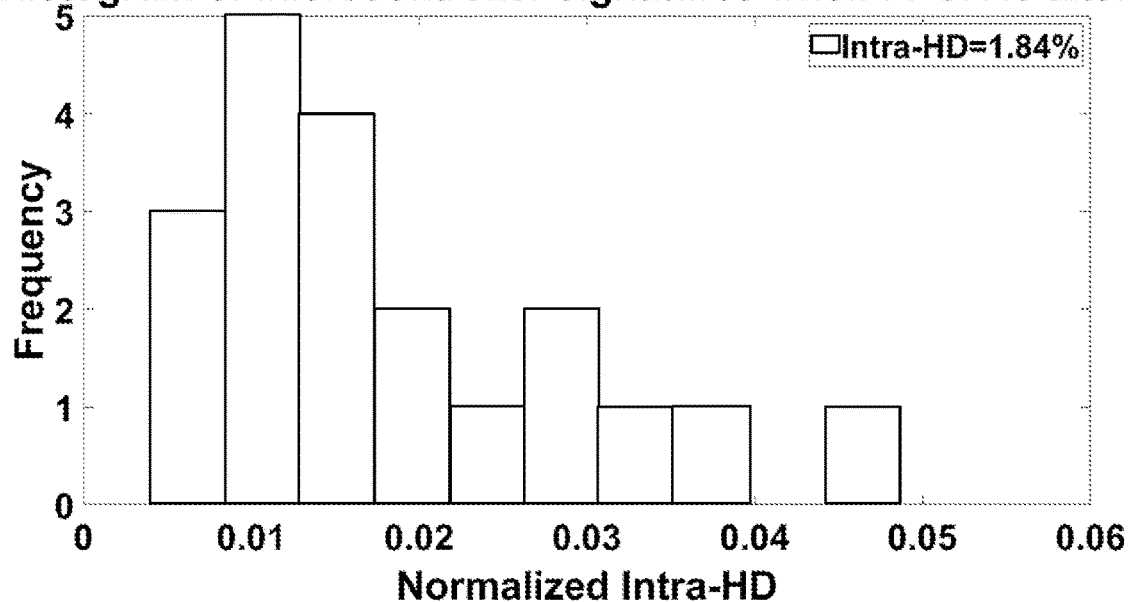
FIGS. 13A and 13B provide test results of intentional alteration to detect in-field tampering in accordance with the present disclosure.
Figure 13B:
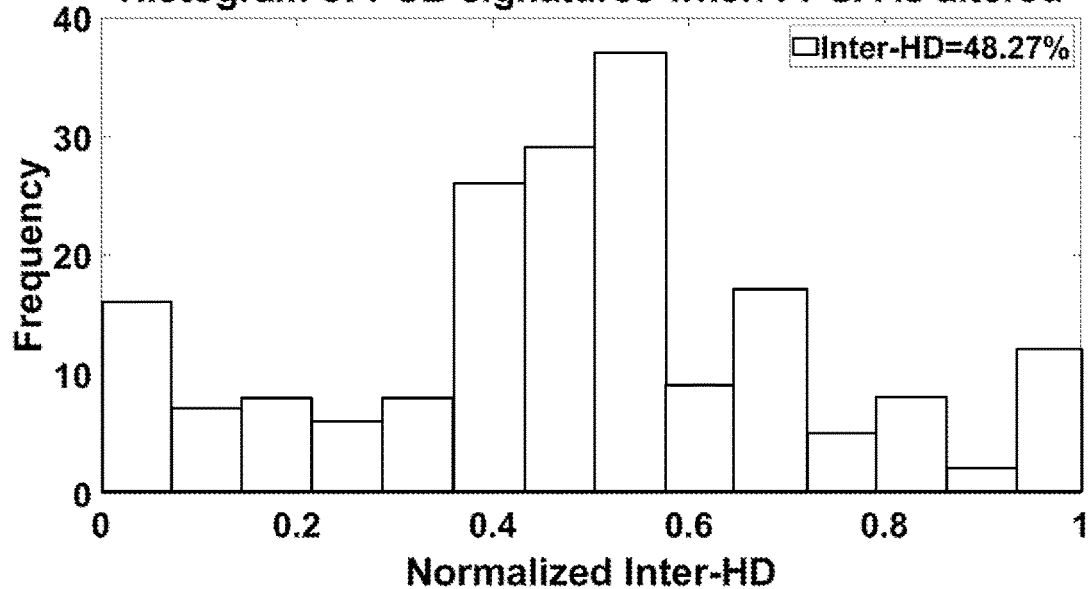

Accordingly, experiments were performed on the HaHa platform by pretending to be an attacker/adversary, where the on-board FPGA was replaced 20 times, and each time, a different FPGA was implanted. From the point-of-view of a PUF, the untouched component (microcontroller) should result in the same chip level signature. Still, as the FPGA is intentionally counterfeited, the board level signatures must change every time. FIGS. 13A-13B illustrate the results of intentional alteration experiments in HaHa boards. In particular, FIG. 13A shows intra-HD results for the same microcontroller with the on-board FPGA being replaced 20 different times on the PCB, and FIG. 13B shows inter-HD results for PCB signatures when the 20 different FPGAs are used. FIG. 13A reveals that when only FPGA is counterfeited, the microcontroller signatures demonstrate an average intra-HD of 1.8421%, which means that regardless of the change brought to the boundary scan chain, the microcontroller can generate the same signatures. On the other hand, FIG. 13B depicts the PCB level results due to this change in the boundary scan chain. The average inter-HD was calculated as 48.27%. According to the definition of uniqueness, this value is close to 50%, which means from the perspective of PUF characteristics, every time the FPGA is replaced, it creates different signatures as the tampered PCB can be considered as a different PCB compared to the genuine one.

An exemplary method in accordance with embodiments of the present disclosure comprises providing a printed circuit board having one or more integrated circuits and a boundary scan architecture built in the printed circuit board for testing the integrated circuits and/or the printed circuit board, the boundary scan architecture including a plurality of boundary scan cells connected to I/O pins of the integrated circuits; applying an input test pattern into the one or more integrated circuits that is shifted serially through the plurality of boundary scan cells; measuring side-channel parameters (e.g., delay and/or current variations) in the boundary scan architecture as the input test pattern traverses the plurality of boundary scan cells; creating a unique signature for the one or more integrated circuits or the printed circuit board from the measured side-channel parameters (e.g., delay and/or current variations) in the boundary scan architecture by converting analog values for the side-channel parameters (e.g., delay and/or current variations) into a digital bitstream; comparing the created unique signature with a stored signature for the one or more integrated circuits and the printed circuit board; successfully authenticating the one or more integrated circuits or the printed circuit board when the created unique signature matches the stored signature for the one or more integrated circuits or the printed circuit board; and/or successfully detecting hardware tampering attacks (unauthorized addition and subtraction of circuit elements like integrated circuits to and from the printed circuit board). Such a method can also perform runtime remote authentication after the device is deployed and is operational to prevent hardware tampering attacks, in various embodiments.

An exemplary apparatus in accordance with embodiments of the present disclosure comprises a printed circuit board having one or more integrated circuits and a boundary scan architecture built in the printed circuit board for testing the integrated circuits and/or the printed circuit board, the boundary scan architecture including a plurality of boundary scan cells connected to I/O pins of the integrated circuits, wherein the plurality of boundary scan cells are connected in series; a JTAG controller embedded in the printed circuit board, the JTAG configured to pass an input test pattern to the one or more integrated circuits that is shifted serially through the plurality of boundary scan cells; a voltage regulator circuit that is configured to distribute power to the one or more integrated circuits, the voltage regulator circuit comprising a current sensor that is configured to measure a current supplied through the voltage regulator as the input test pattern traverses the plurality of boundary scan cells; and an analog to digital converter deployed with the voltage regulator circuit, wherein the analog to digital converter is configured to convert analog values for current values measured by the current sensor into a digital bitstream representing a possible digital signature for the printed circuit board.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure.

The invention claimed is:

1. A method comprising:
providing a printed circuit board having a plurality of integrated circuits and a boundary scan architecture built in the printed circuit board for testing the integrated circuits or the printed circuit board, the boundary scan architecture including a plurality of boundary scan cells connected to I/O pins of the integrated circuits, wherein the printed circuit board is embedded with a voltage regulator that is configured to distribute power to the plurality of integrated circuits, the voltage regulator comprising a current sensor that is configured to measure a current supplied through the voltage regulator as an input test pattern traverses the plurality of boundary scan cells, wherein the printed circuit board is further embedded with an analog to digital converter deployed with the voltage regulator, wherein the analog to digital converter is configured to convert analog values for current values measured by the current sensor into a digital bitstream representing a possible digital signature for the printed circuit board;
applying the input test pattern into one or more integrated circuits that is shifted serially through the plurality of boundary scan cells, wherein the input test pattern is configured to activate individual ones of the plurality of integrated circuits;
measuring at least one side-channel parameter in the boundary scan architecture as the input test pattern traverses the plurality of boundary scan cells, wherein the at least one side-channel parameter comprises a measurement of current flowing through the current sensor; and
creating a unique signature for the one or more integrated circuits or the printed circuit board from the measured at least one side-channel parameter in the boundary scan architecture by converting, via the analog to digital converter, analog values for the at least one side-channel parameter into a digital bitstream.

2. The method of claim 1, further comprising:
comparing the created unique signature with a stored signature for the one or more integrated circuits or the printed circuit board; and
successfully authenticating the one or more integrated circuits or the printed circuit board when the created unique signature matches the stored signature for the one or more integrated circuits and the printed circuit board.

3. The method of claim 2, further comprising successfully detecting a hardware tampering attack when the created unique signature does not match with the stored signature.

4. The method of claim 1, wherein the at least one side-channel parameter further comprises a path delay variation for a boundary scan cell path.

5. The method of claim 1, individual integrated circuit, wherein the at least one side-channel parameter comprises a measurement of current variations for an output port of the individual integrated circuit, wherein the created unique signature is associated with the individual integrated circuit.

6. The method of claim 1, further comprising activating each of the plurality of integrated circuits at the same time, wherein the at least one side-channel parameter comprises a measurement of current variations at an output port of the printed circuit board, wherein the created unique signature is associated with the printed circuit board.

7. The method of claim 1, wherein the at least one side-channel parameter comprises a path delay variation and the measurement of current comprises a measurement of current variations.

8. The method of claim 1, wherein the plurality of boundary scan cells are a subset of all of the boundary scan cells embedded on the printed circuit board.

9. The method of claim 8, further comprising selecting the subset of the boundary scan cells from all of the boundary scan cells.

10. The method of claim 1, wherein the plurality of boundary scan cells are all of the boundary scan cells embedded on the printed circuit board.

11. An apparatus comprising:
a printed circuit board having one or more integrated circuits and a boundary scan architecture built in the printed circuit board for testing the integrated circuits or the printed circuit board, the boundary scan architecture including a plurality of boundary scan cells connected to I/O pins of the integrated circuits, wherein the plurality of boundary scan cells are connected in series;
a controller embedded in the printed circuit board, the controller configured to pass an input test pattern to the one or more integrated circuits that is shifted serially through the plurality of boundary scan cells;
a voltage regulator circuit embedded in the printed circuit board that is configured to distribute power to the one or more integrated circuits, the voltage regulator circuit comprising a current sensor that is configured to measure a current supplied through the voltage regulator circuit as the input test pattern traverses the plurality of boundary scan cells; and
an analog to digital converter embedded in the printed circuit board and deployed with the voltage regulator circuit, wherein the analog to digital converter is configured to convert analog values for current values measured by the current sensor into a digital bitstream representing a possible digital signature for the printed circuit board.

12. The apparatus of claim 11, further comprising:
a wireless module configured to transmit the possible digital signature and a valid digital signature to a remote computing device so that the possible digital signature can be authenticated against the valid digital signature.

13. The apparatus of claim 12, wherein the wireless module, controller, and the current sensor are deployed with the voltage regulator circuit on the same integrated circuit.

14. The apparatus of claim 11, wherein changes in current values measured by the current sensor result from shifts in the input test pattern within the boundary scan cells of the printed circuit board.

15. The apparatus of claim 11, further comprising a dedicated current sensor connected to each of the one or more integrated circuits.

16. The apparatus of claim 15, further comprising a measurement device coupled to an output pin of the dedicated current sensor connected to an individual integrated circuit, wherein the measurement device is configured to capture a series of current parameters and generate a digital signature for the individual integrated circuit based on the captured current parameters.

17. The apparatus of claim 16, further comprising a measurement device coupled to an output pin of an individual integrated circuit, wherein the measurement device is configured to capture a series of path delay values and generate a digital signature for the individual integrated circuit based on the captured path delay values.

18. The apparatus of claim 11, wherein the plurality of boundary scan cells are all of the boundary scan cells embedded on the printed circuit board.

19. The apparatus of claim 11, wherein the plurality of boundary scan cells are a subset of all of the boundary scan cells embedded on the printed circuit board.

\* \* \* \* \*